(12) United States Patent
Souma

(10) Patent No.: US 7,567,389 B2
(45) Date of Patent: Jul. 28, 2009

(54) ZOOM LENS, IMAGE PICKUP APPARATUS AND DIGITAL EQUIPMENT

(75) Inventor: Yoshihito Souma, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/141,332

(22) Filed: Jun. 18, 2008

(65) Prior Publication Data

US 2009/0002846 A1     Jan. 1, 2009

(30) Foreign Application Priority Data

Jun. 27, 2007   (JP) .............................. 2007-169335

(51) Int. Cl.
   G02B 15/14      (2006.01)
(52) U.S. Cl. ................. 359/682; 359/686; 359/713; 359/714; 359/726; 359/740; 359/761; 359/770
(58) Field of Classification Search ................. 359/680, 359/682–686, 713, 714, 726, 740, 761, 770
   See application file for complete search history.

(56) References Cited

U.S. PATENT DOCUMENTS

| 7,369,322 B2* | 5/2008 | Souma ........................ 359/680 |
| 2007/0229971 A1* | 10/2007 | Souma ........................ 359/686 |

FOREIGN PATENT DOCUMENTS

| JP | 2004-348082 A | 12/2004 |
| JP | 2006-71993 A | 3/2006 |

* cited by examiner

*Primary Examiner*—Evelyn A. Lester
(74) *Attorney, Agent, or Firm*—Sidley Austin LLP

(57) ABSTRACT

A zoom lens includes a first lens group having a negative optical power and including a reflection optical element; a second lens group having a positive optical power; a third lens group having a negative optical power; a fourth lens group having a positive optical power; and, a fifth lens group. At least the second lens group and the fourth lens group move to the object side of the zoom lens for varying a power of the zoom lens from a wide-angle end to a telephoto end. The zoom lens further includes a diaphragm and the diaphragm moves to the object side for varying the power of the zoom lens from the wide-angle end to the telephoto end.

15 Claims, 12 Drawing Sheets

EXAMPLE 1

EXAMPLE 2

EXAMPLE 4

EXAMPLE 5

EXAMPLE 1

EXAMPLE 2

EXAMPLE 3

EXAMPLE 4

EXAMPLE 5

ZOOM LENS, IMAGE PICKUP APPARATUS AND DIGITAL EQUIPMENT

This application is based on Japanese Patent Application No. 2007-169335 filed on Jun. 27, 2007, in Japanese Patent Office, the entire content of which is hereby incorporated by reference.

TECHNICAL FIELD

The present invention relates to a zoom lens, an image pickup apparatus and a digital equipment. Particularly, it relates to a zoom lens that is used for, for example, an optical unit for taking in an image of a subject with an image pickup element, has a variable power ratio of about five times and has a zoom area exhibiting relatively wide angle of view, to an image pickup apparatus equipped with the zoom lens and to a digital equipment equipped with the image pickup apparatus.

BACKGROUND

In recent years, a digital camera has come into wide use rapidly, and it has exceeded a device to take in simply an image into a computer, to be used widely as a tool to take photographs in the same way as in conventional silver halide cameras. Under the aforesaid condition, demands for functions useful for taking photographs (for example, a higher variable power ratio and a wider angle of view) and for providing a thin and compact digital camera have become strong. Further, achievement of higher optical ability is requested, because the number of pixels of the image pickup element is in the trend to increase year after year. Even an equipment for taking in a moving image, such as a camcorder, is requested an optical ability that is higher than the conventional one, with a background of coping with still image picture-taking function and with high definition television such as Hi-Vision.

There is generally used a technique to bend an optical path in an optical unit as an effective technique for reducing thickness of an apparatus having a function of image pickup, such as a digital camera. For example, Unexamined Japanese Patent Application Publication (JP-A) No. 2006-71993 suggests a zoom lens including, in order from the object side, a first lens group having positive optical power including a prism that bends an optical path, a second lens group having negative optical power, a third lens group having positive optical power, a fourth lens group having positive optical power and a fifth lens group. The zoom lens achieves variable power ratio of about ×5 by constituting the so-called positive-lead zoom type. Further, JP-A No. 2004-348082 suggests a zoom lens achieving a wider angle of view by including, in order from the object side, a first lens group having negative optical power including a prism that bends an optical path, a second lens group having negative optical power, and a third lens group having positive optical power.

The zoom lens disclosed in JP-A No. 2006-71993 achieves a variable power ratio of about ×5 but has the total angle of view at the wide-angle end of about 60°, which is not regarded as a wide angle of view. When bending the optical path by arranging a reflection optical element in the first lens group, a size of a space needed to bend an optical path (when the reflection optical element is a prism for example, it corresponds to an optical path length of the prism) depends on a beam height that is highest among the off-axial beam height on an incident surface of a reflection optical element and the off-axial beam height on an emergent surface of the reflection optical element, on sections including optical axes before and after the optical path is bent. Therefore, for making a space needed for the bending to be small, it is effective to arrange a negative lens at the object side of the reflection optical element, and to position an entrance pupil position to be closer to the object side. In the zoom lens disclosed in JP-A No. 2006-71993, it is difficult to make negative optical power of the negative lens positioned on the object side of the reflection optical element to be stronger, because an optical power of the first lens group is positive. Therefore, when providing a wider angle of view with the zoom lens disclosed in JP-A No. 2006-71993, a space needed for the bending is reluctantly increased.

The zoom lens disclosed in JP-A No. 2004-348082 achieves a wide angle of view exceeding 70°, but has a variable power ratio of about ×3, which is not regarded as sufficient. In a negative-lead zoom type wherein the first lens group has negative optical power, it is easy to make an effective diameter of a lens closer to the object to be small, because an entrance pupil is generally positioned to be relatively close to the object. In the negative-lead zoom type, and there is also a merit suitable for a wider angle of view such as it can have a structure of a retro-focus type easily at the wide-angle end. However, the zoom lens disclosed in JP-A No. 2004-348082 varies its power by moving greatly a lens group including a diaphragm and positive optical power, which causes a problem that F-number is largely fluctuated due to varying power under the condition that an open aperture of a diaphragm has a fixed diameter. Therefore, for achieving higher variable power while controlling fluctuations of F-number to be within an allowable range, the zoom lens requires a mechanism to change a diameter of a diaphragm when varying its power.

SUMMARY

The present invention has been achieved in view of the aforesaid situation, and an object of the invention is to provide a zoom lens, an image pickup apparatus equipped with the zoom lens, and the digital equipment equipped with the image pickup apparatus, where the zoom lens exhibits a wide angle of view such as a total angle of view exceeding 70° within the variable-power range, has the variable-power ratio of about ×5, and enables an image pickup apparatus to be thin by bending the optical path in the first lens group.

There is provided a zoom lens comprising, in order from an object side thereof: a first lens group having a negative optical power and comprising a reflection optical element for bending an optical path by almost 90 degrees; a second lens group having a positive optical power; a third lens group having a negative optical power; a fourth lens group having a positive optical power; and a fifth lens group. The zoom lens further comprises a diaphragm arranged between a surface closest to an image side of the zoom lens in the third lens group and a surface closest to the image side in the fourth lens group. In the zoom lens, at least the second lens group and the fourth lens group move to the object side so as to reduce a distance between the first lens group and the second lens group and a distance between the third lens group and the fourth lens group, for varying a power of the zoom lens from a wide-angle end to a telephoto end. In the zoom lens, the diaphragm moves to the object side for varying the power of the zoom lens from the wide-angle end to the telephoto end.

These and other objects, features and advantages according to the present invention will become more apparent upon reading of the following detailed description along with the accompanied drawings.

BRIEF DESCRIPTIONS OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
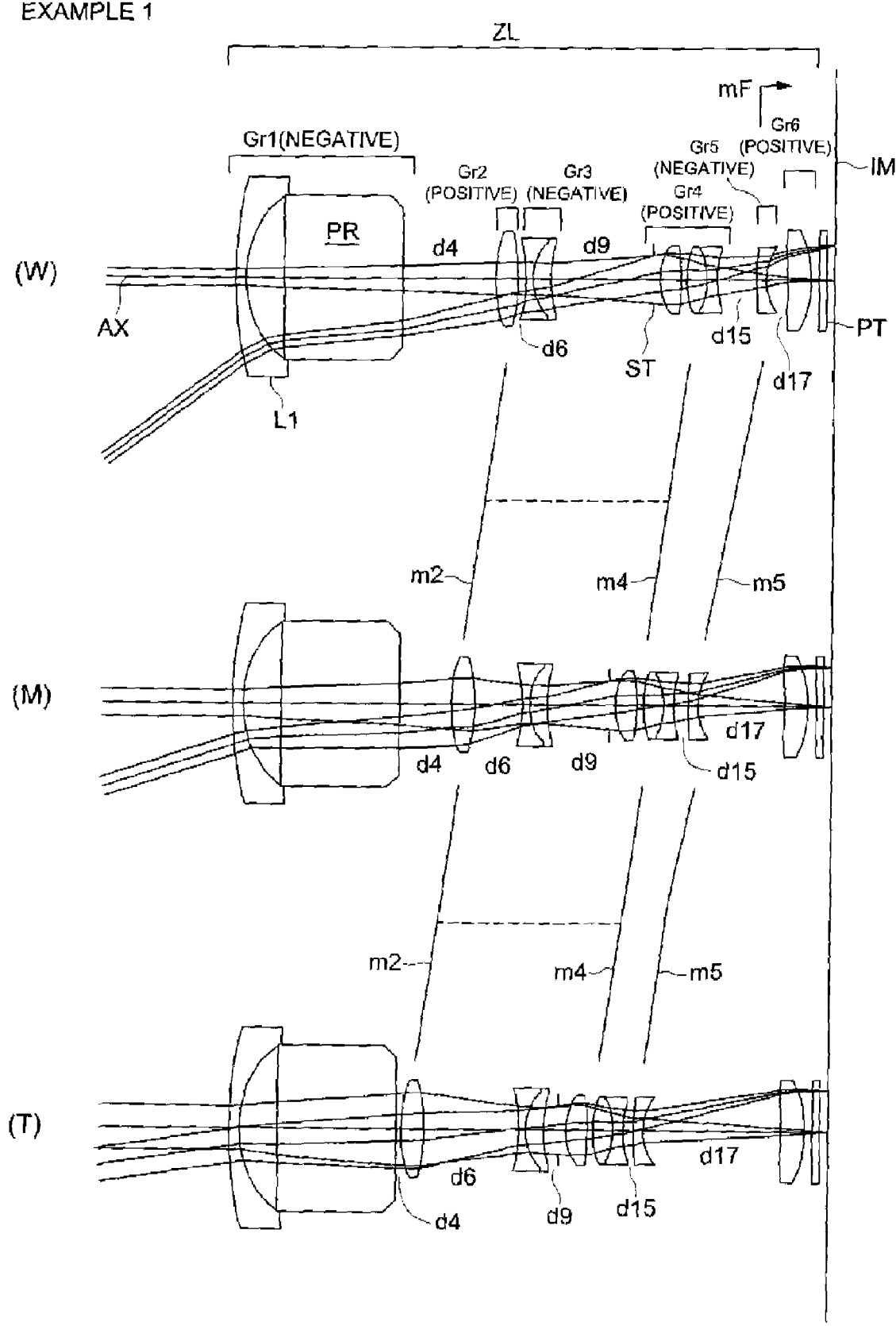
FIG. 1 is an optical schematic diagram of the first embodiment (Example 1)
Figure 2:
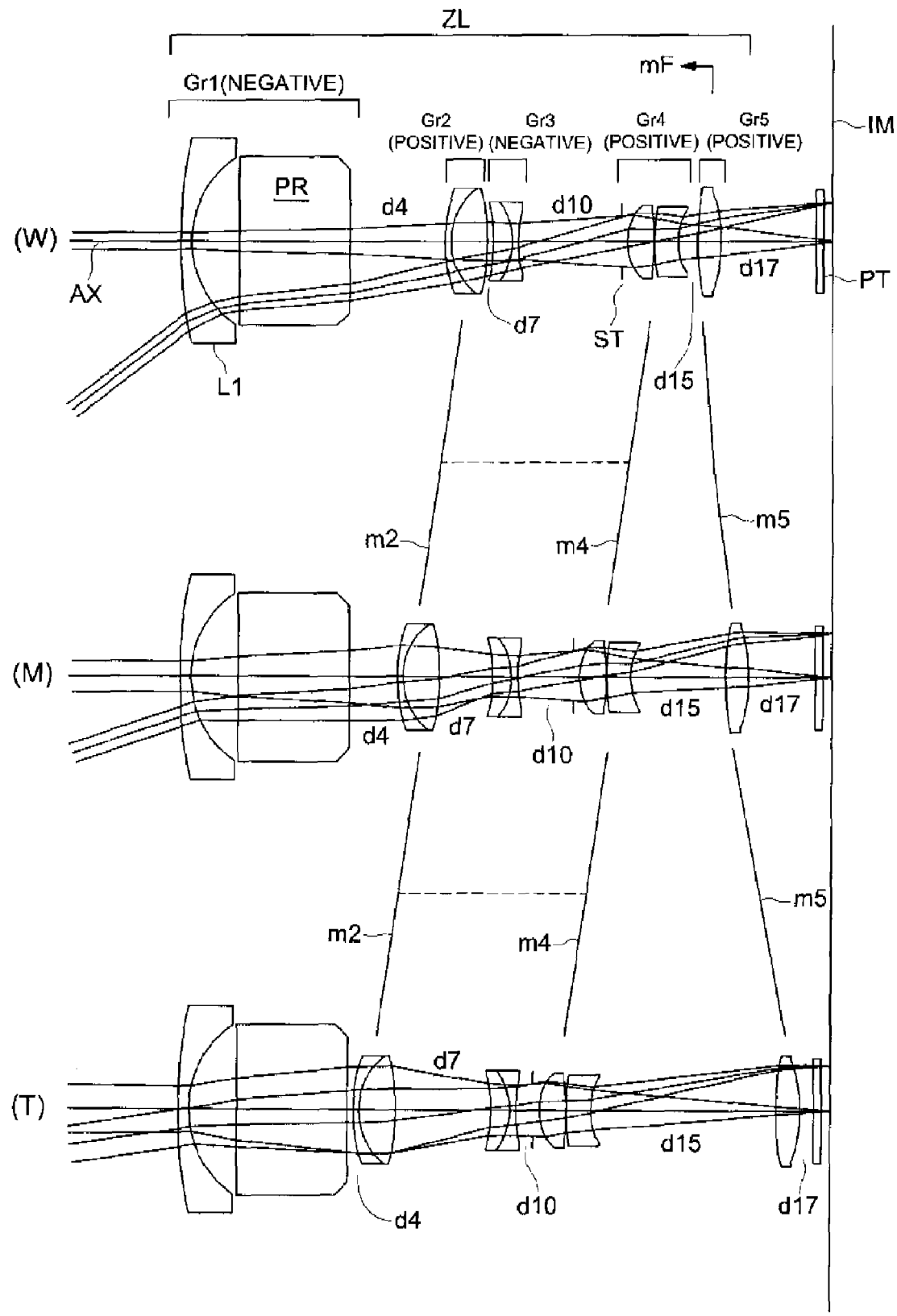
FIG. 2 is an optical schematic diagram of the second embodiment (Example 2)
Figure 3:
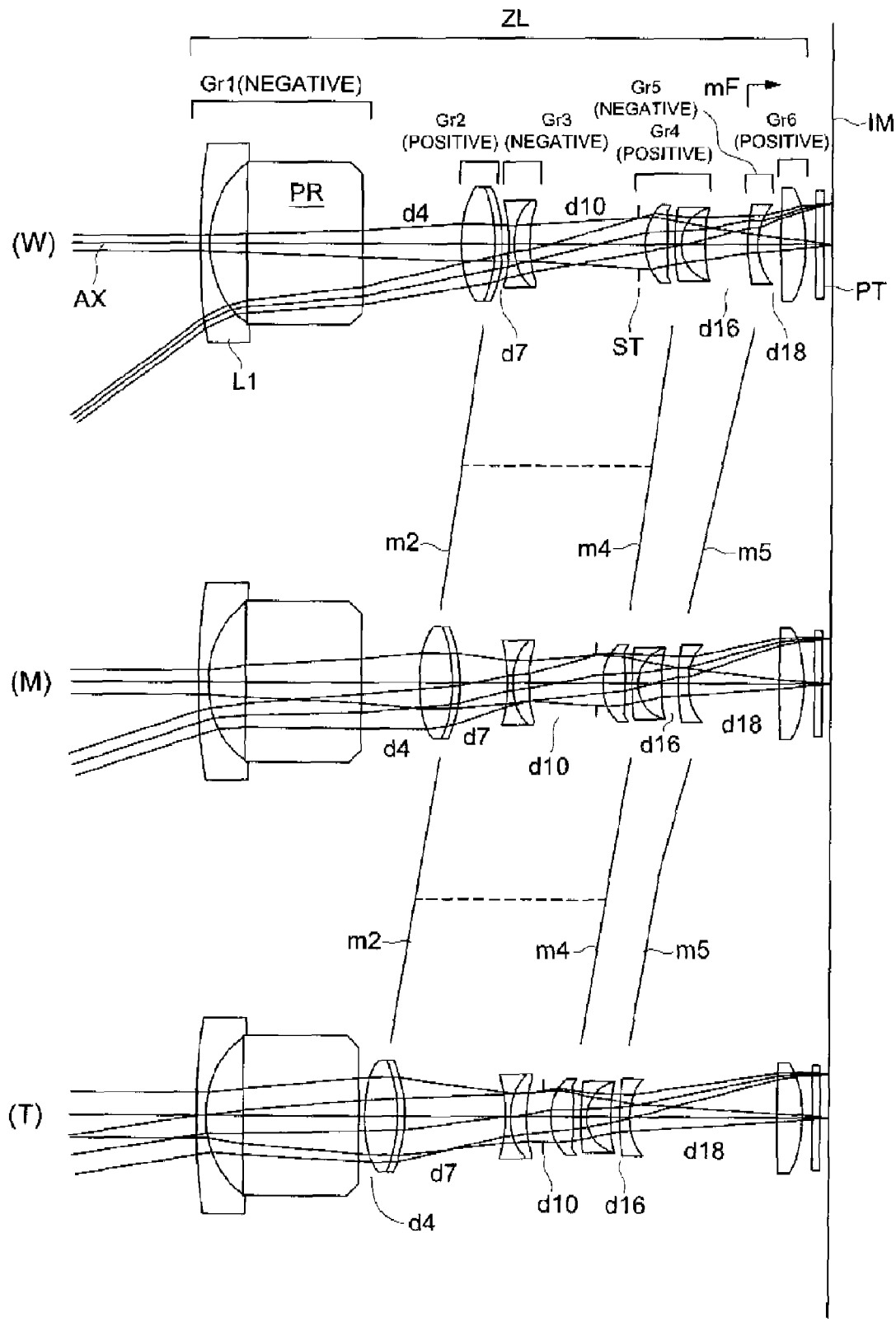
FIG. 3 is an optical schematic diagram of the third embodiment (Example 3)
Figure 4:
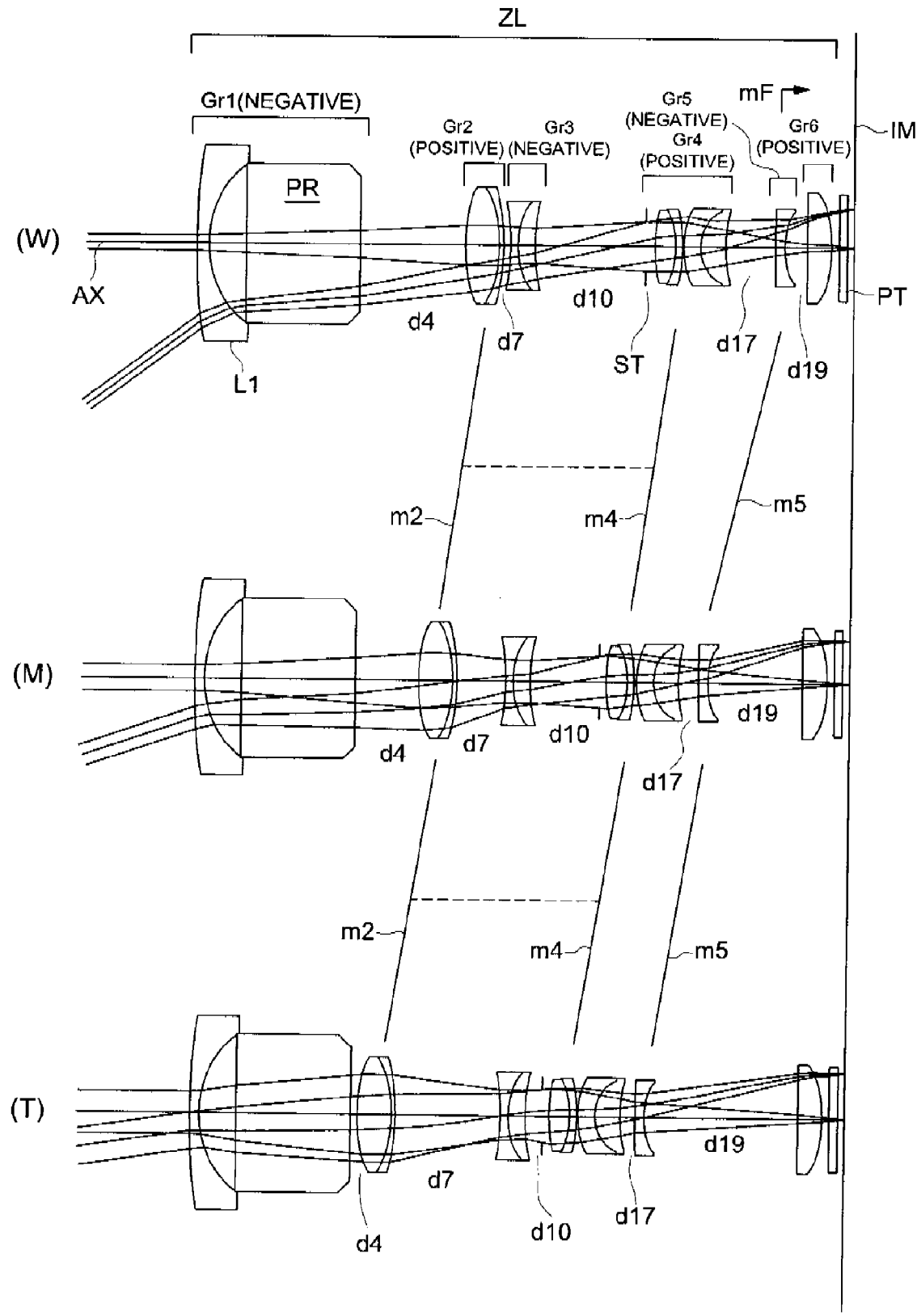
FIG. 4 is an optical schematic diagram of the second embodiment (Example 4)
Figure 5:
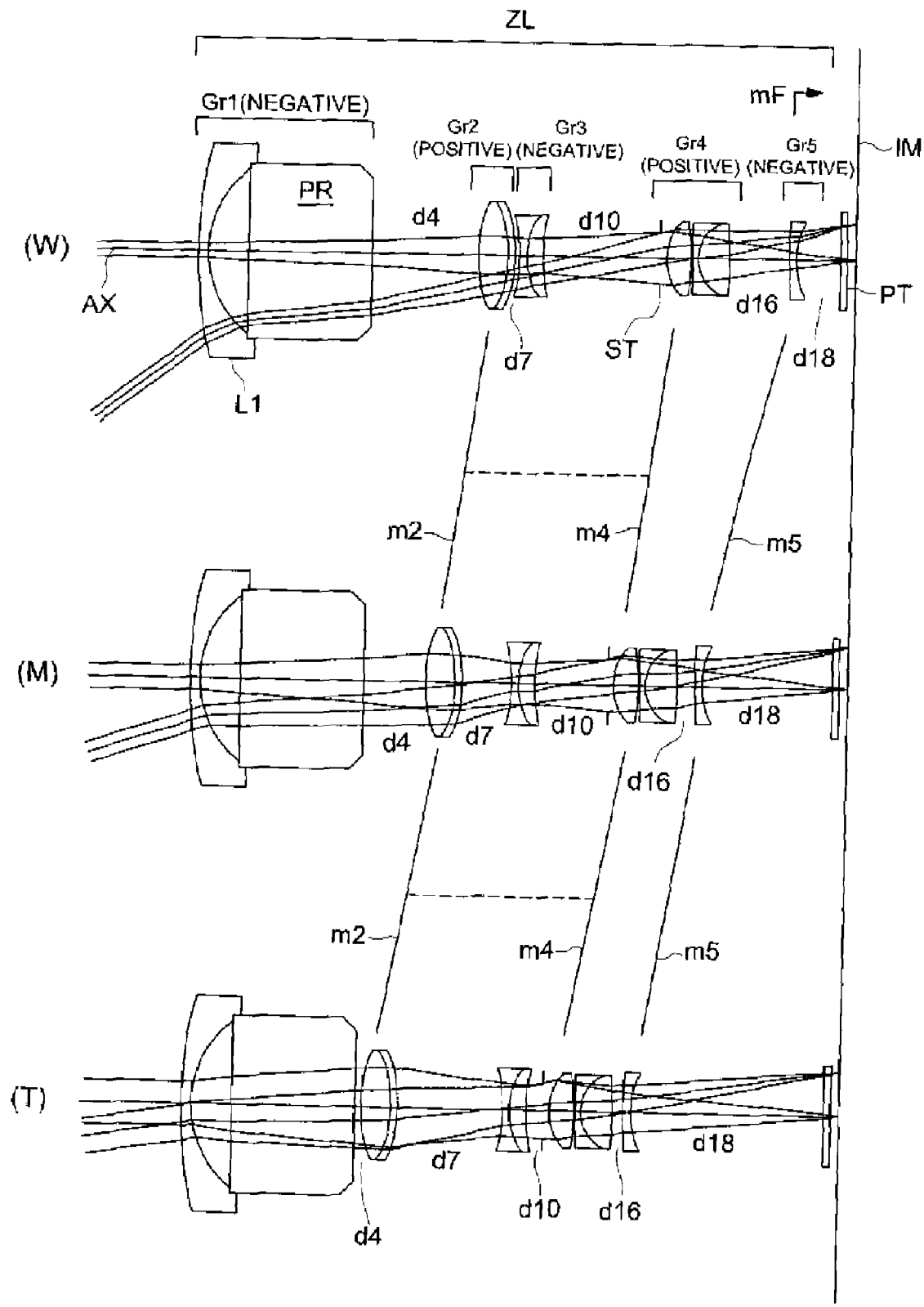
FIG. 5 is an optical schematic diagram of the second embodiment (Example 5)
Figure 6:
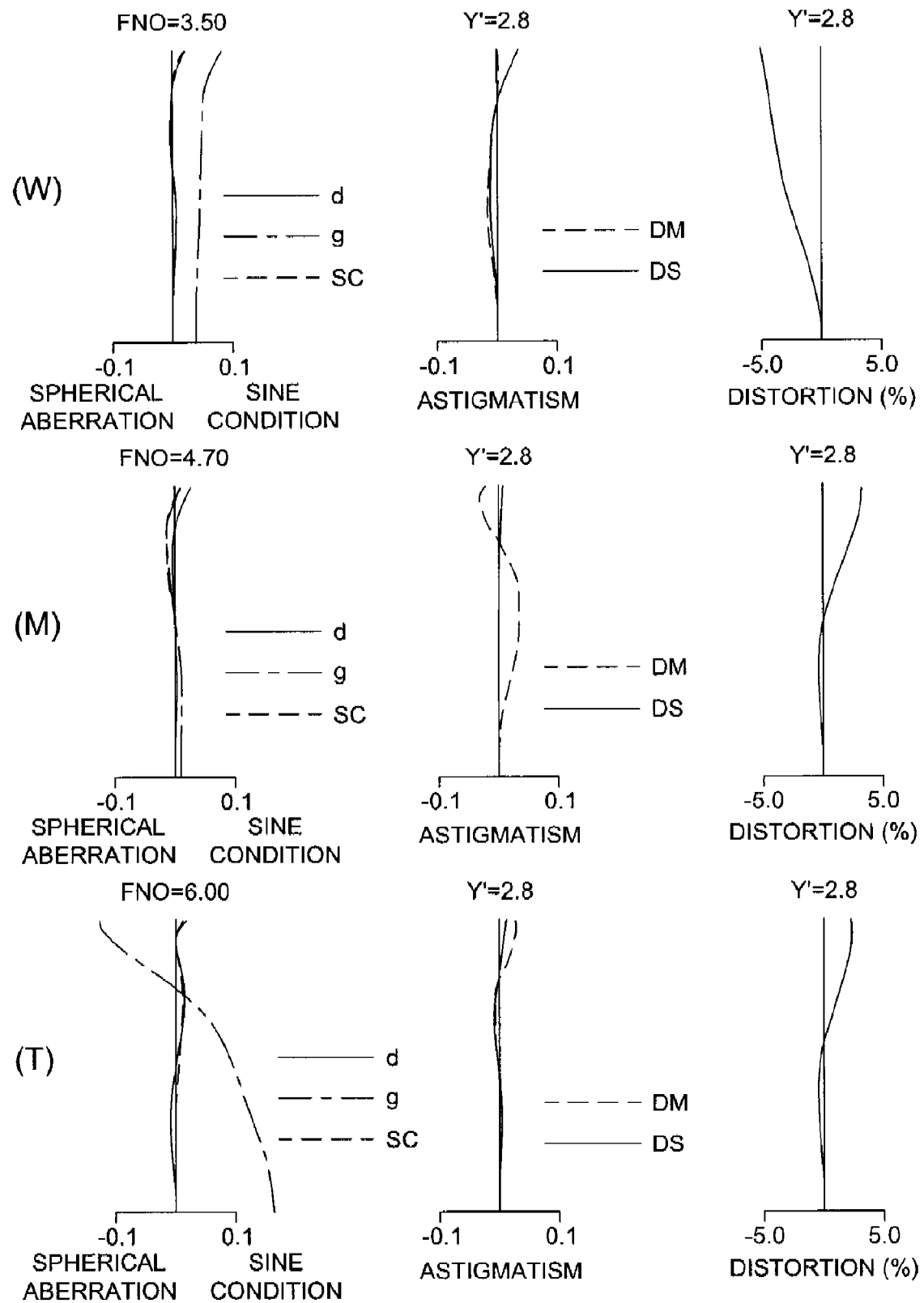
FIG. 6 is an aberration diagram of Example 1.
Figure 7:
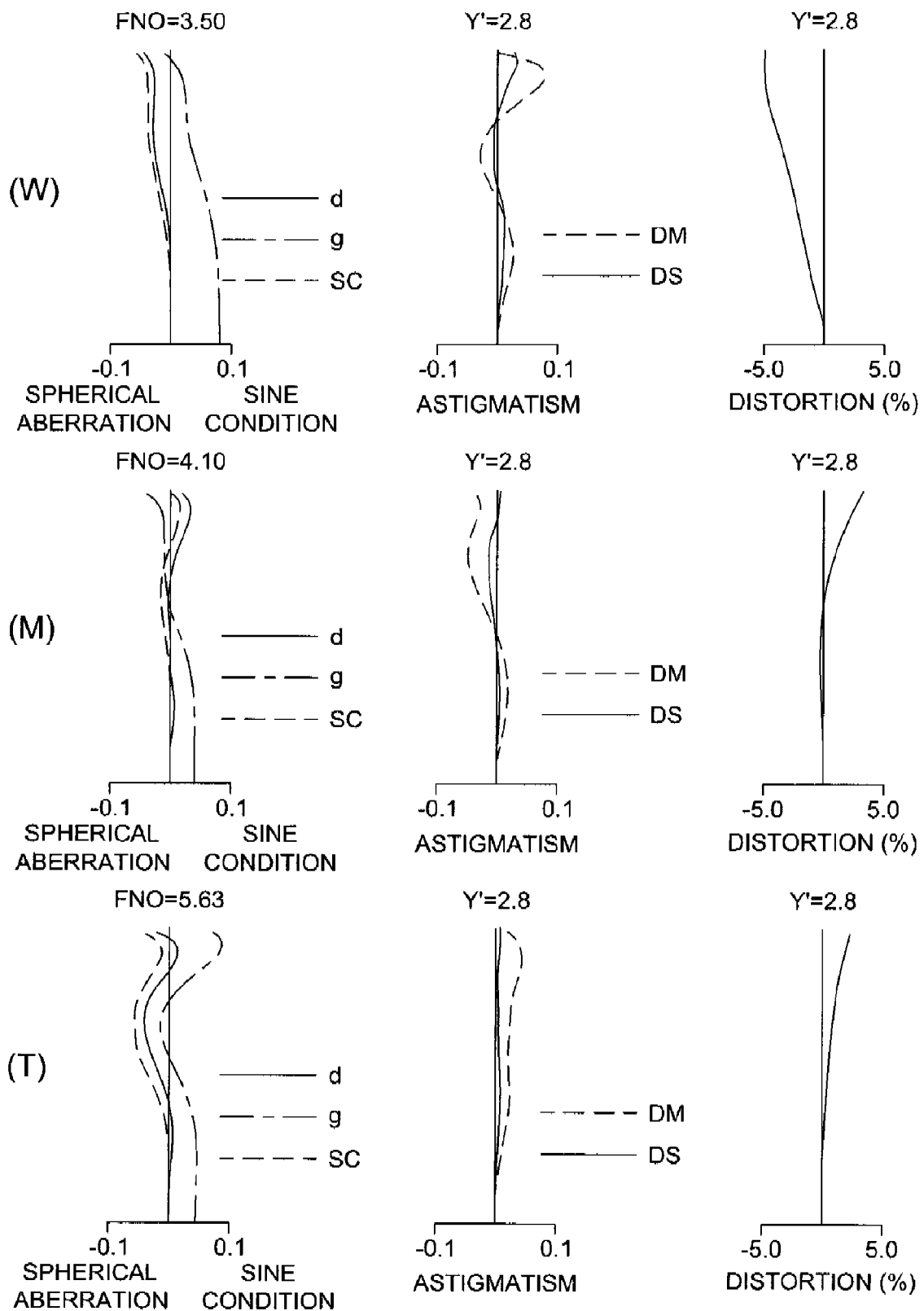
FIG. 7 is an aberration diagram of Example 2.
Figure 8:
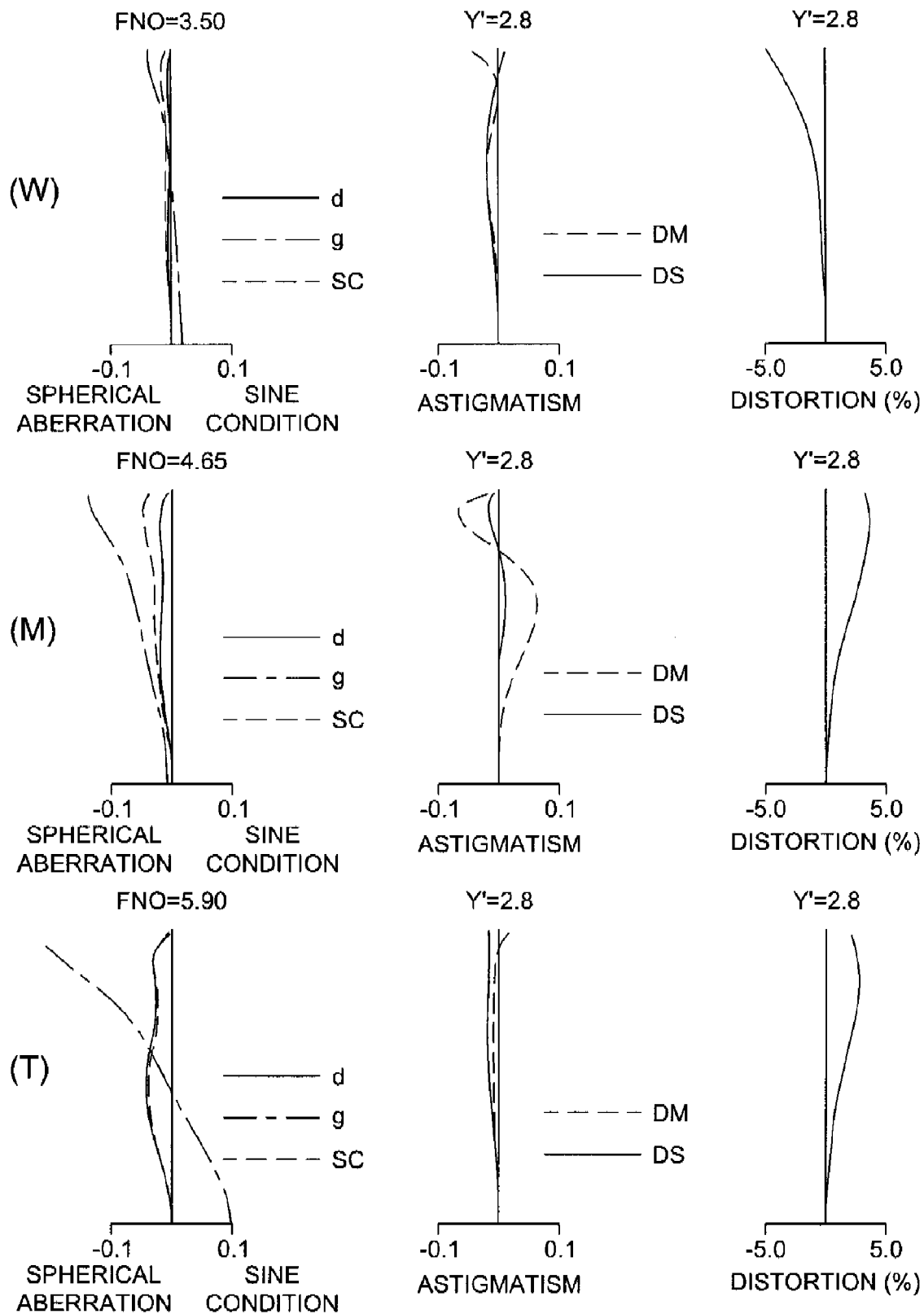
FIG. 8 is an aberration diagram of Example 3.
Figure 9:
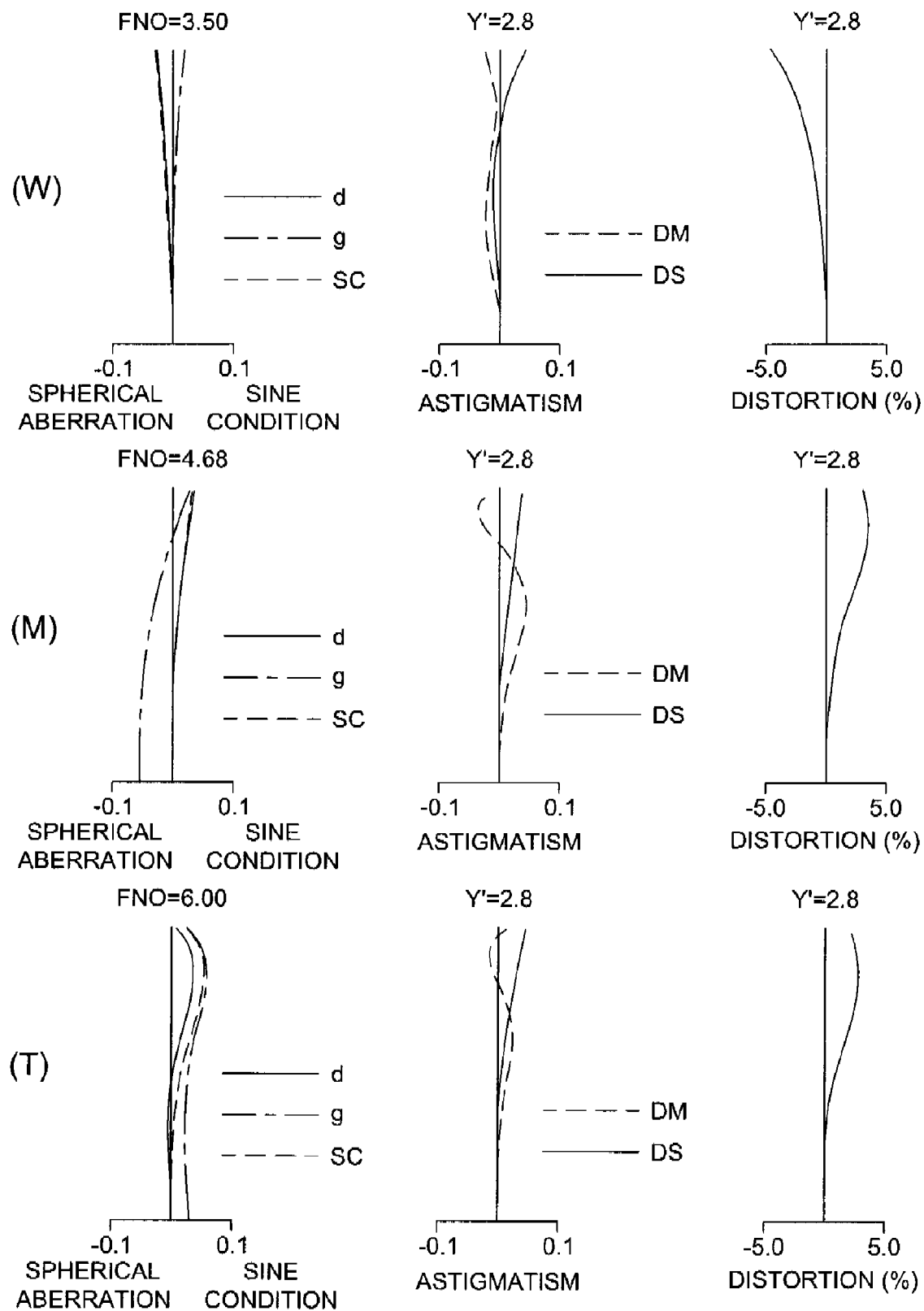
FIG. 9 is an aberration diagram of Example 4.
Figure 10:
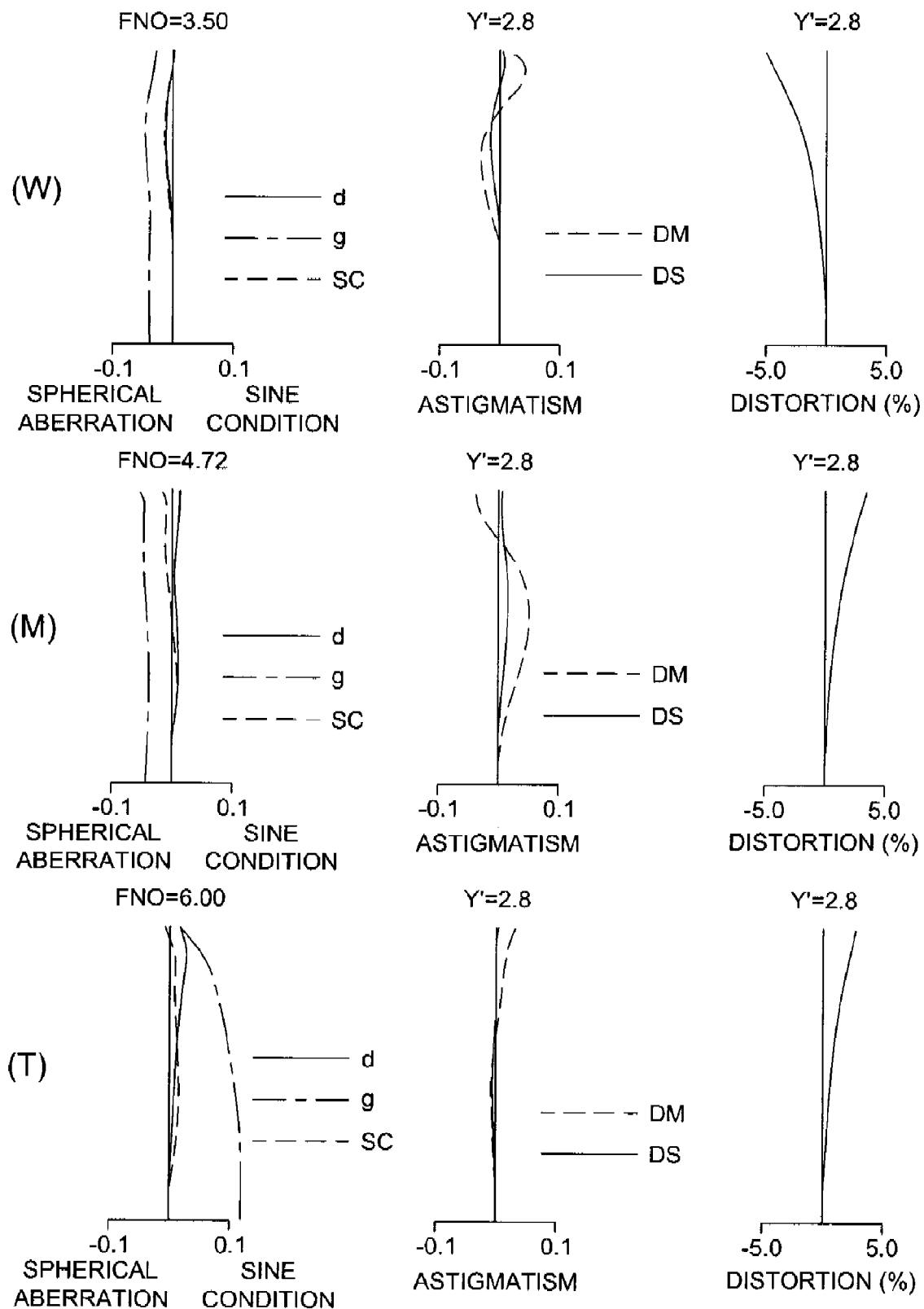
FIG. 10 is an aberration diagram of Example 5.

A zoom lens, an image pickup apparatus and a digital equipment as an preferred embodiment of the invention will be explained as follows, referring to the drawings. The zoom lens as an embodiment includes, in order from an object side thereof: a first lens group having a negative optical power and including a reflection optical element for bending an optical path by almost 90 degrees; a second lens group having a positive optical power; a third lens group having a negative optical power; a fourth lens group having a positive optical power; and a fifth lens group. The zoom lens further includes a diaphragm arranged between a surface closest to an image side of the zoom lens in the third lens group and a surface closest to the image side in the fourth lens group. In the zoom lens, at least the second lens group and the fourth lens group move to the object side so as to reduce a distance between the first lens group and the second lens group and a distance between the third lens group and the fourth lens group, for varying a power of the zoom lens from a wide-angle end to a telephoto end. The diaphragm moves to the object side for varying the power of the zoom lens from the wide-angle end to the telephoto end.

Features of the above preferred embodiment can realize a relatively compact zoom lens in which an optical path is bent and which exhibits total angle of view exceeding 70° within the variable-power range and has the variable-power ratio of about ×5, while keeping a high optical property within the all zoom region such as spherical aberration and field curvature of 50 μm or lower, and the maximum distortion of about 5%. Therefore, this embodiment can provide a zoom lens that exhibits a wide angle of view such as the total angle of view exceeding 70° within the variable-power range and has the variable-power ratio of about ×5, and enables an image pickup apparatus to be thin by bending the optical path in the first lens group. Thus, by using the image pickup apparatus for a digital equipment such as a digital camera, it is possible to contribute to provide a thinner, lighter and more compact digital equipment with higher efficiencies and higher functions at a reduced cost.

For example, by providing the following structure, the embodiment can realize a higher variable power ratio and reduced size with good balance, which is preferable: the structure includes, in order from the object side, the first lens group having negative optical power, the second lens group having positive optical power, the third lens group having negative optical power, the fourth lens group having positive optical power and the fifth lens group, and moves at least the second lens group and the fourth lens group toward the object side so that a distance between the first lens group and the second lens group and a distance between the third lens group and the fourth lens group may be reduced when varying power from the wide-angle end to the telephoto end. In other words, the aforesaid constitution enables to move a position of a principal point on the rear side of the total system of the zoom lens from the image side to the object side efficiently when varying power from the wide-angle end to the telephoto end. Thus, the structure attains a high variable power ratio while keeping the total length of the optical system relatively small. Further, it is possible to make a thickness of an image pickup apparatus carrying a zoom lens to be thinner in the direction of a thickness of the image pickup apparatus, by providing a reflection optical element in the first lens group to bend an optical path by almost 90°.

Further, by arranging an optical diaphragm between a surface of the third lens group closest to the image side and a surface of the fourth lens group closest to the image side, so that the optical diaphragm may be moved to the object side when varying power from the wide-angle end to the telephoto end, it is possible to keep the fluctuation of F-number due to varying power to be within an allowable range, even when using an optical diaphragm which keeps the constant diameter when varying power. The reasons for the foregoing will be explained as follows, referring to FIG. 11 and FIG. 12.

Figure 11:
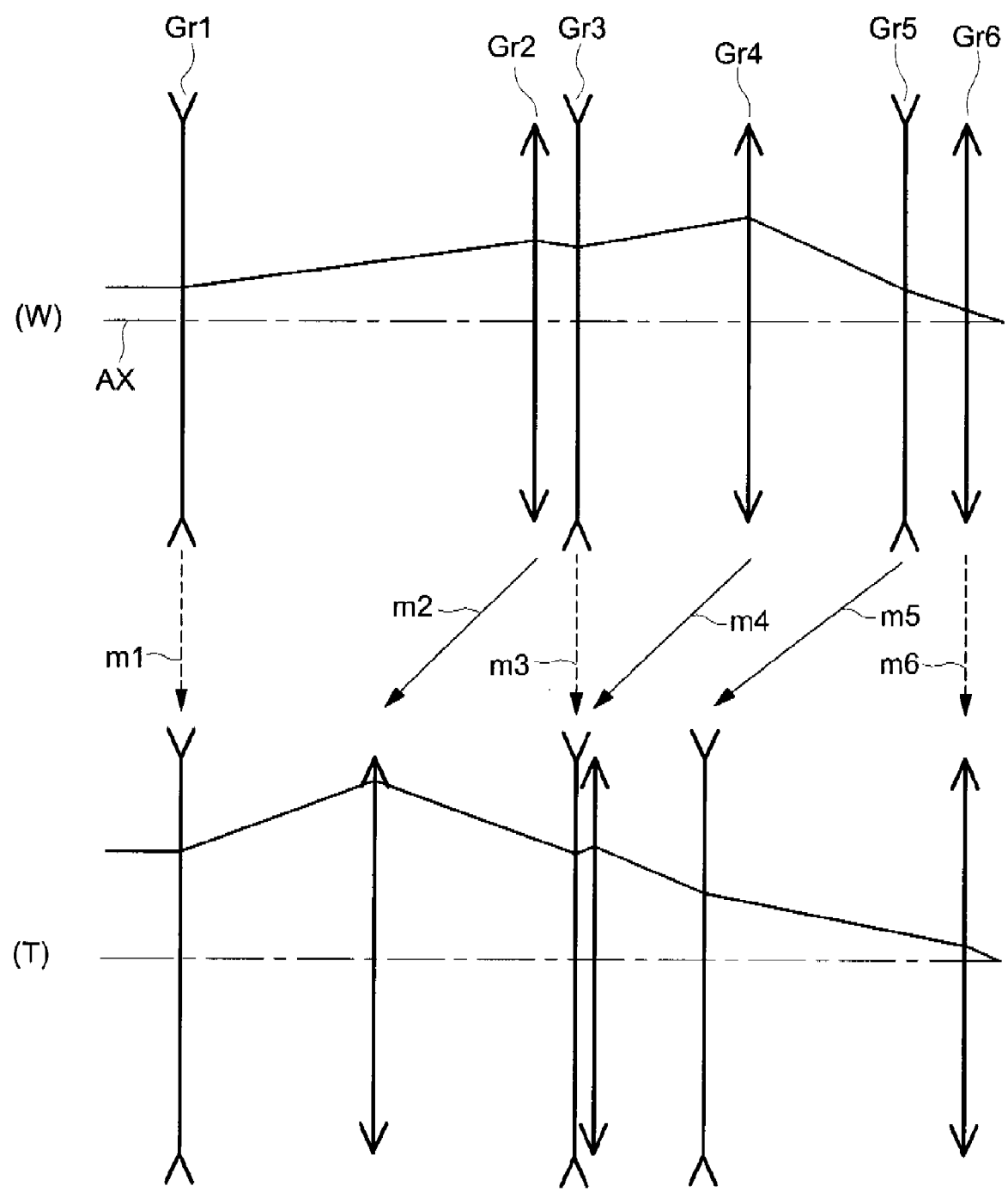
FIG. 11 is an optical path diagram showing power arrangement and an axial beam height at each of a wide-angle end and a telephoto end of a six-group zoom lens having negative, positive, negative, positive, negative and positive lens groups.
Figure 12:
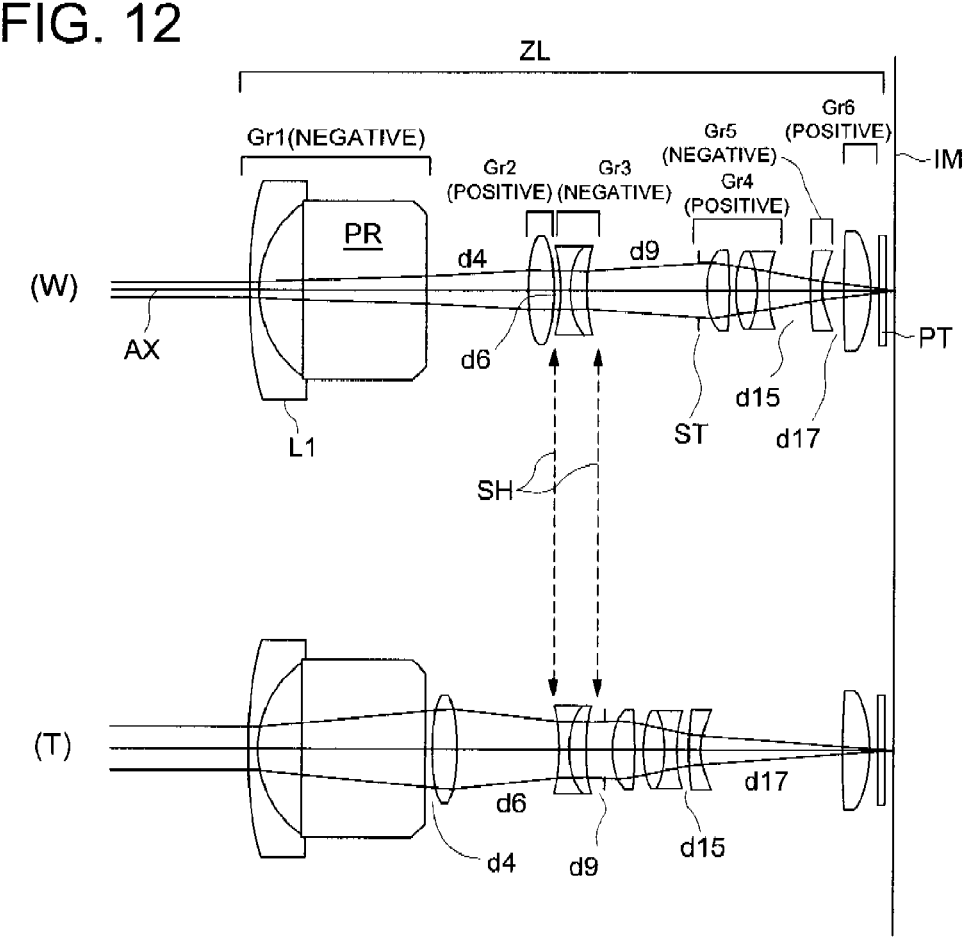
FIG. 12 is an optical path diagram showing an optical path of an axial beam at each of a wide-angle end and a telephoto end of the first embodiment (Example 1)

FIG. 11 shows power arrangement and an axial beam height at wide-angle end (W) and telephoto end (T) of a six-group zoom lens having negative, positive, negative, positive, negative and positive lens groups. The first embodiment will be explained later as an example of the six-group zoom lens having this power arrangement. FIG. 12 shows an optical path of axial beams at wide-angle end (W) and telephoto end (T) of the six-group zoom lens. As can be seen from FIG. 11, the zoom lens realizes a short focal length at wide-angle end (W), by employing the so-called retro-focus type wherein the negative first lens group Gr1 causes an axial light flux to diverge, and an axial beam height becomes the highest at the fourth lens group Gr4 after the axial beam passing through the second lens group Gr2 and the third lens group Gr3. On the other hand, at the telephoto end (T), the axial beam height is the highest at the second lens group Gr2, and then, the height becomes gradually lower as the beam passes through the succeeding lens groups toward the image plane. Therefore, when F-number at the wide-angle end (W) and F-number at the telephoto end (T) are tried to be close each other (namely, when a sensor incident angle of axial marginal beam at the wide-angle end (W) and a sensor incident angle of axial marginal beam at the telephoto end (T) are tried to be close each other), a diaphragm keeping a fixed diameter during varying power is hardly arranged on an area closer the object-side than the position providing the highest axial beam height, where the area includes the third lens group Gr3 and an area closer to the object side than the third lens group Gr3.

The fourth lens group Gr4 is a lens group that is in charge of primary portions of converging actions of the total lens system at the wide-angle end (W). For downsizing of an optical system, the system requires relatively strong positive optical power. Arranging the optical diaphragm to be close to the fourth lens group Gr4 at the wide-angle end (W) restricts the height of the off-axial beam at the fourth lens group Gr4 having relatively strong optical power, which is preferable on the point of correction of off-axis aberration at wide-angle end (W). Further, moving the optical diaphragm toward the object side (for example, zoom movement of diaphragm ST in FIG. 12) in the case of varying power from wide-angle end (W) to telephoto end (T), enables to employ the constitution so as not to disturbing the movement of the fourth lens group Gr4 for varying power even when an optical diaphragm is arranged to be close to the fourth lens group Gr4 at the wide-angle end (W) as stated above. If the optical diaphragm is arranged to be closer to the image side than the surface closest to the image side in the fourth lens group Gr4, a position of an entrance pupil is moved reluctantly toward the direction of the image plane, which is not preferable on the point of reduction of the space needed for pending the optical axis. Further, if the optical diaphragm is arranged to be closer to the image side than the surface closest to the image side in the fourth lens group Gr4, the overall optical system becomes exclusively asymmetrical to an optical diaphragm, which is not preferable on the point of correction of off-axis aberration, too.

From the foregoing, it is preferable to employ the constitution wherein an optical diaphragm is arranged between a surface of the third lens group closest to the image side and a surface of the fourth lens group closest to the image side, and moves toward the object side when varying power from a wide-angle end to a telephoto end. Under the constitution of this kind, it is not necessary to change a diameter of a diaphragm to conform to varying power for the purpose of controlling fluctuations of F-number in the case of varying power. In addition, it is possible to position an entrance pupil to be relatively closer to the object side, which can prevent the space for bending the optical axis from increasing and can effectively control over the off-axis aberration at a wide-angle end.

Therefore, this embodiment can realize a compact zoom lens which has excellent properties and enables an image pickup apparatus to be thin by bending the optical path in the first lens group, while keeping high variable-power ratio such that wide angle of view is exhibited in the range of the variable power. When an image pickup apparatus equipped with the aforesaid zoom lens is used in equipment such as a digital camera, it is possible to contribute to provide a thinner, lighter and more compact digital equipment with higher efficiencies and higher functions at a reduced cost. Preferable conditions for obtaining the aforesaid effects in a balanced manner and for achieving further higher optical properties will be explained as follows. In the followings, the zoom lens satisfying the conditions explained below, preferably exhibits a ratio of variable power of about ×4-×7, in view of a balance with higher efficiencies and downsizing, and more preferably of about ×5.

The zoom lens preferably satisfies the following conditional expression (1).

$$-0.05 < \phi 23w \cdot fw < 0.05 \qquad (1)$$

In the expression (1), $\phi 23w$ represents a composite optical power of the second and third lens groups at the wide-angle end, and fw represents a focal length of an overall system of the zoom lens at the wide-angle end.

The conditional expression (1) defines a preferable range concerning composite optical power of the second and third lens groups. As stated above, the embodiment can realize a short focal length, by employing the structure of the so-called retro-focus type wherein the negative first lens group causes an axial light flux to diverge and the fourth lens group causes the divergent axial light to converge. If the value of the expression (1) exceeds the upper limit, the composite optical power of the second and third lens groups at the wide-angle end becomes positive which is too strong, therefore, it is necessary to broaden further a distance between the first lens group and the fourth lens group, or to strengthen an optical power of the fourth lens group, in order to shorten the focal length. If the former action is taken, an optical system is enlarged, while, if the latter action is taken, an increase of various aberrations caused by strengthening optical power is brought reluctantly, resulting in a conclusion that both of them are not preferable. In contrast to this, when a value falls below the lower limit of the expression (1), the composite optical power of the second lens group and the third lens group becomes negative which is too strong, and positive optical power of the second lens group is hardly secured sufficiently. Therefore, when trying to attain the desired variable-power ratio, an amount of movement of the second lens group is increased and an optical system is enlarged reluctantly. When trying to maintain the positive optical power of the second lens group to avoid the foregoing, the negative optical power of the third lens group becomes too strong. This is not preferable on the point of correction of aberration, although it is preferable on the point of downsizing of the optical system.

It is preferable that the second lens group and the fourth lens group moves as one body for varying the power of the zoom lens. By taking this constitution, a mechanism of varying power can be simplified. The second lens group and the fourth lens group can moves unitedly, by employing the constitution, for example, that a lens barrel of the second lens group and that of the fourth lens group are united, and that the second lens group and the fourth lens group are moved by the same lead screw. By employing the constitution of this kind, it is possible to varying the power of the zoom lens with one actuator, without using an additional mechanism such as a cam.

It is preferable that the third lens group is statically positioned for varying power of the zoom lens. By statically arranging the third lens group for zooming, a mechanism for varying power can be simplified.

It is further preferable that the zoom lens further includes a mechanical shutter, and the mechanical shutter is arranged between the second lens group and the third lens group or between the third lens group and the fourth lens group and is statically positioned for varying power. By positioning the mechanical shutter statically when zooming, a mechanism for varying power can be simplified. In FIG. 12, positions of mechanical shutter SH which is statically arranged during zooming with the third lens group Gr3 are shown with arrows of dotted lines. The mechanical shutter SH can be arranged between the second lens group Gr2 and the third lens group Gr3, or between the third lens group Gr3 and the fourth lens group Gr4.

It is preferable that a lens arranged closest to the object side in the first lens group (namely, the first lens) is a negative lens including a concave surface facing the image side, and the surface of the first lens facing the image side is an aspheric surface such that a negative refractive power at a position on the aspheric surface becomes smaller as the position moves from a center to a periphery of the surface. By arranging an aspheric surface in the first lens, off-axis aberration at a wide-angle end can be corrected effectively. Further, when correcting aberration by arranging the aspheric surface of the first lens to face the image side, that aspheric surface becomes a surface whose negative optical power becomes weaker toward the circumference, which makes it possible to make a thickness of the first lens to be smaller while keeping the power of the first lens. It is therefore preferable on the point of providing a thinner optical unit. Incidentally, in zoom lens ZL shown in FIG. 12, the first lens L1 is a negative meniscus lens whose concave surface faces the image side and the concave surface is an aspheric surface such that a negative refractive power at a position on the aspheric surface becomes smaller as the position moves from a center to a periphery of the aspheric surface.

It is preferable that the first lens group is composed only of one negative lens and a reflection optical element. In a positive-lead optical system wherein an optical path is bent in the first lens group, when a negative lens is arranged on the subject side of the reflection optical element for the purpose of reducing a space needed for bending the optical axis, positive lens components is required to be on the image side of the reflection optical element for securing positive optical power of the first lens group. In the zoom lens relating to the invention, the first lens group has the negative optical power, and the first lens group can be composed of only one negative lens having optical power and of the reflection optical element. Therefore, the mechanical constitution of the zoom lens can be simplified.

The zoom lens preferably satisfies the following conditional expressions (2) and (3):

$$0.4 < f12t/ft < 0.8 \quad (2)$$

$$2.0 < |f1|/fw < 3.2 \quad (3)$$

In the expressions, f12t represents a composite focal length for the first lens group and the second lens group at a telephoto end, f1 represents a focal length of the first lens group, ft represents a focal length of the overall system of the zoom lens at a telephoto end and fw represents a focal length of the overall system of the zoom lens at a wide-angle end.

Conditional expression (2) stipulates a preferable range of conditions concerning a composite focal length of the first lens group and the second lens group. If a value of the conditional expression (2) exceeds the upper limit, a composite optical power of the first and second lens groups at a telephoto end becomes too weak, and it is difficult to keep the total length of the optical system at a telephoto end to be short. In contrast to this, when a value of the conditional expression (2) falls below the lower limit, the composite optical power of the first and second lens groups becomes too strong, and it is difficult to control aberration fluctuation due to varying power, although it is preferable in the viewpoint of the total length of the optical system at a telephoto end.

Conditional expression (3) stipulates a preferable range of conditions concerning a focal length of the first lens group. If a value of the conditional expression (3) exceeds the upper limit, an optical power of the first lens group becomes too weak, and it is difficult to keep the total length of the optical system to be short. In contrast to this, when a value of the conditional expression (2) falls below the lower limit, optical power of the first lens group becomes too strong, and it is difficult to control off-axis aberration at a wide-angle end, although it is preferable in the viewpoint of the total length of the optical system.

The zoom lens more preferably satisfies the following conditional expressions (2a) and (3a).

$$0.5 < f12t/ft < 0.74 \quad (2a)$$

$$2.2 < |f1|/fw < 2.9 \quad (3a)$$

Each of these conditional expressions (2a) and (3a) stipulates a range of conditions which is based on the aforesaid viewpoints and is more preferable among each range of conditions stipulated by each of the aforesaid conditional expressions (2) and (3).

There can be cited examples of a specific constitution of a zoom lens which includes, in order from the object side, a negative first lens group, a positive second lens group, a negative third lens group, a positive fourth lens group, and a fifth lens group, in which at least the second lens group and the fourth lens group move toward the object side so as to reduce a distance between the first lens group and the second lens group and a distance between the third lens group and the fourth lens group for varying power of the zoom lens from a wide-angle end to a telephoto end. For example, one of the examples is a five-group zoom lens in which the fifth lens group has positive or negative optical power. Another example is a six-group zoom lens in which the fifth lens group has negative optical power and the sixth lens group has positive optical power. In other words, there are given the following three types of zoom lenses wherein the second lens group, the fourth lens group and the fifth lens group are provided as moving lens groups. By employing the constitution described below, it is possible to realize a small-sized and optical-path bending zoom lens having the variable-power ratio of about ×4 to ×7 and exhibits a wide angle of view within the variable-power range.

A zoom lens of the first type is a zoom lens including, in order from the object side, a first lens group having negative optical power, a second lens group having positive optical power, a third lens group having negative optical power, a fourth lens group having positive optical power and a fifth lens group having positive optical power. In the zoom lens of the first type, the second lens group, the fourth lens group and the fifth lens group move for varying power. A zoom lens of the second type is a zoom lens including, in order form the object side, a first lens group having negative optical power, a second lens group having positive optical power, a third lens group having negative optical power, a fourth lens group having positive optical power and a fifth lens group having negative optical power. In the zoom lens of the second type, the second lens group, the fourth lens group and the fifth lens group move for varying power. A zoom lens of the third type is a zoom lens including, in order from the object side, a first lens group having negative optical power, a second lens group having positive optical power, a third lens group having negative optical power, a fourth lens group having positive optical power, a fifth lens group having negative optical power and a sixth lens group having positive optical power. In the zoom lens of the third type, the second lens group, the fourth lens group and the fifth lens group move for varying power.

A zoom lens relating to the invention is suitable to be used as an image pickup optical system for a digital equipment having an image inputting function (for example, a digital camera and a video camera). By combining this with an image pickup element, an image pickup apparatus that takes in images of a subject optically and outputs them as electric signal can be constructed. The image pickup apparatus is an optical apparatus that serves as a primary constituent element of a camera used in shooting a still image or an video of the subject, and it includes, in order from the object (subject) side, an image pickup optical system (zoom lens) forming an optical image of an object (subject) and an image pickup element for converting the optical image formed with the image pickup system into electric signal, for example.

As an example of the camera, there are given a digital camera, a video camera, a security camera, an onboard camera and a camera for a TV phone, and there are further given cameras which are embedded in or attached externally on digital equipment such as a personal computer, a portable information equipment (for example, a small-sized portable information equipment terminal such as a mobile computer, a cellphone and a portable information terminals) and their peripheral equipment (scanner, printer or the like). As is understood from these examples, it is not only possible to constitute a camera by using an image pickup apparatus, but also possible to add camera functions by mounting an image pickup apparatus on each equipment. For example, it is possible to constitute a digital equipment with a function of image inputting such as a cellphone with a camera.

Figure 13:
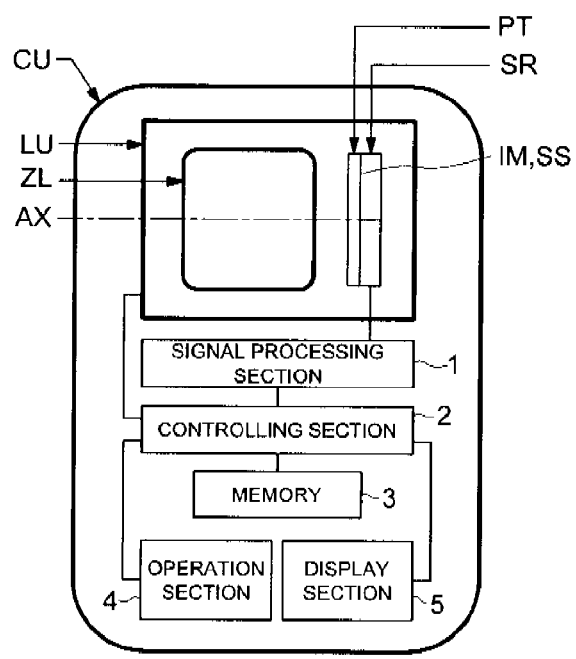
FIG. 13 is a diagram showing an example of a schematic structure of a digital equipment carrying an image pickup apparatus.

FIG. 13 shows an example of a schematic structure of digital equipment CU (corresponding to a digital equipment with a function of image inputting such as a digital camera) with its schematic section. Image pickup apparatus LU mounted on digital equipment CU shown in FIG. 13 is equipped with: zoom lens ZL (corresponding to image pickup optical system) that forms optical image (image plane) IM of a subject on a power variable basis; parallel flat plate PT (corresponding to an optical filter such as an optical low-pass filter and infrared cut filter arranged if necessary, and to a cover glass of image pickup element SR); and image pickup element SR that has a light-receiving surface SS and converts optical image IM formed on light receiving surface SS by zoom lens ZL into electric signal. When digital equipment CU having a function of inputting an image is composed of the image pickup apparatus LU, the image pickup apparatus LU should be arranged inside its body usually. However, when realizing a camera function with the image pickup apparatus LU, an embodiment of the invention is not limited to that and can employ any embodiment satisfying the necessity to realize the camera function. For example, unitized image pickup apparatus LU can be constituted so that it may be mounted on or dismounted from a main body of digital equipment CU freely, or it may be mounted on the main body rotatably.

As image pickup element SR, a solid-state image pickup element such as CCD (Charge Coupled Device) having plural pixels or CMOS (Complementary Metal Oxide Semiconductor), for example, can be used. Since the zoom lens ZL is provided so that optical image IM of a subject may be formed on light-receiving surface SS of image pickup element SR, the optical image IM formed by the zoom lens ZL is converted into electric signal by the image pickup element SR.

The digital equipment CU is equipped with signal processing section 1, controlling section 2, memory 3, operation section 4 and display section 5, in addition to the image pickup apparatus LU. Signal generated by the image pickup element SR is subjected to prescribed digital image processing or image compression processing in the signal processing section 1, in case of need, and it is recorded as digital image signal on memory 3 such as a semiconductor memory and optical disc, or it is sometimes transferred to another equipment through cables or through conversion to infrared signal. The controlling section 2 is composed of a microcomputer, and it controls intensively a shooting function, an image reproduction function, and a lens moving mechanism for zooming and focusing. For example, the controlling section 2 controls image pickup apparatus LU so as to shoot at least one of a still image and video of the subject. The display section 5 is a section including a display such as a liquid crystal monitor, and it displays images by using image signals obtained through conversion by image pickup element SR or by using image information recorded on memory 3. The operation section 4 is a section including an operation member such as a manual operation button (for example, a release button) and an operation dial (for example, an operation mode dial), and it transmits information inputted by an operator for operation to the controlling section 2.

The zoom lens ZL has a zoom constitution including four lens groups of a negative first lens group, a positive second lens group, a negative third lens group and a positive fourth lens group, and further including a fifth lens group, as stated above. In the zoom lens ZL, plural lens groups move along optical axis AX to change a distance between lens groups for varying power of the zoom lens (namely, zooming). The optical image to be formed by the zoom lens ZL passes through an optical low-pass filter (corresponding to parallel flat plate PT shown in FIG. 13) having a predetermined cutoff frequency defined by a pixel pitch of the image pickup element SR. Thereby, a spatial frequency characteristics of the optical image is adjusted, so that so-called turnaround noises generated in the course of converting into electric signals may be minimized. Owing to this, generation of color moiré can be controlled. However, if performance in the periphery of the resolution-limit frequency is controlled, it is not necessary to be anxious about generation of a noise even when no optical low-pass filter is used, and it is not necessary to use an optical low-pass filter when a user takes or appreciates images by using a display system in which a noise is not so conspicuous (for example, a liquid crystal screen of a cellphone).

Next, a specific optical constitution of zoom lens ZL will be explained in detail, referring to the first-fifth embodiments. Each of FIG. 1-FIG. 5 shows lens arrangements of the zoom lens ZL at wide-angle end (W), midrange (M) and telephoto end (T) for each of the first-fifth embodiments. These zoom lenses ZL are constituted as a folded optical system, and each of FIG. 1-FIG. 5 shows each lens constitution with an optical section in the state that the optical path is unfolded.

Zoom lens ZL in each of the first, third and fourth embodiments is a six-group zoom lens forming optical image IM of an object onto image pickup element SR with variable power and having a negative lens group, a positive lens group, a negative lens group, a positive lens group, a negative lens group and a positive lens group. Zooming operation for the zoom lens ZL is conducted by changing a distance between lens groups (for example, surface-distances d4, d6, d9, d15 and d17 in the case of the first embodiment; surface-distances d4, d7, d10, d16 and d18 in the case of the third embodiment; and surface-distances d4, d7, d10, d17 and d19 in the case of the fourth embodiment). Zoom lens ZL in the second embodiment is a five-group zoom lens forming optical image IM of an object onto image pickup element SR with variable power and having a negative lens group, a positive lens group, a negative lens group, a positive lens group and a positive lens group. Zooming operation of the zoom lens ZL is conducted by changing a distance between lens groups (surface-distances d4, d7, d10, d15 and d17). Zoom lens ZL in the fifth embodiment is a five-group zoom lens forming optical image IM of an object onto image pickup element SR with variable power and having a negative lens group, a positive lens group, a negative lens group, a positive lens group and a negative lens group. Zooming operation for the zoom lens ZL is conducted by changing a distance between lens groups (surface-distances d4, d7, d10, d16 and d18).

Each of FIG. 1-FIG. 5 schematically shows a locus of movement for zooming of a moving group with solid lines m2, m4 and m5 in each embodiment. Each of loci m2, m4 and m5 for respective zooming movements shows each of movements of the second lens group Gr2, the fourth lens group Gr4 and the fifth lens group Gr5 in zooming from wide-angle end (W) to telephoto end (T) (namely, relative positional change for image plane IM). In these figures, the second lens group Gr2 and the fourth lens group Gr4 unitedly moves as one body for zooming. Broken lines connecting movement locus m2 with movement locus m4 show that zoom-movement of the second lens group Gr2 is linked with zoom-movement of the fourth lens group Gr4. For example, in the first embodiment and the third-fifth embodiments, the second lens group Gr2 and the fourth lens Gr4 monotonously move toward an object side unitedly for varying power from wide-angle end (W) to telephoto end (T), and the fifth lens group Gr5 monotonously moves toward the object side. In the second embodiment, the second lens group Gr2 and the fourth lens Gr4 monotonously move toward the object side unitedly for varying power from wide-angle end (W) to telephoto end (T), and the fifth lens group Gr5 moves monotonously toward the image side.

In every embodiment, the first lens group Gr1 and the third lens group Gr3 are statically positioned for zooming operation (in other words, each is a fixed lens group). Therefore, when at least the second lens group Gr2 and the fourth lens group Gr4 move toward the object side during zooming from wide-angle end (W) to telephoto end (T), a distance between the first lens group Gr1 and the second lens group Gr2 and a distance between the third lens group Gr3 and the fourth lens group Gr4 are reduced.

In every embodiment, the fifth lens group Gr5 represents a focusing component. Each of the first embodiment and the third-fifth embodiments has the constitution wherein focusing for the short-range object is conducted by moving the fifth lens group Gr5 toward the image side, as shown with arrow mF in each of FIG. 1 and FIGS. 3-5. The second embodiment has the constitution wherein focusing for the short-range object is conducted by moving the fifth lens group Gr5 toward the object side, as shown with arrow mF in FIG. 2.

Even for every embodiment, the fourth lens group Gr4 has a diaphragm (corresponding to an aperture stop) ST arranged to be closest to the object. In other words, diaphragm ST is arranged on the object side next to the fourth lens group Gr4. Since the diaphragm ST moves toward the object side unitedly with the fourth lens group Gr4 in zooming operation from wide-angle end (W) to telephoto end (T) in the constitution (arrow m4 in FIGS. 1-5), the diaphragm ST can be considered as a part of the fourth lens group Gr4. Further, as stated above, mechanical shutter SH that is statically arranged for zooming operation together with the third lens group Gr3, is arranged at a position between the second lens group Gr2 and the third lens group Gr3 or a position between the third lens group Gr3 and the fourth lens group Gr4 as occasion demands (see FIG. 12). Lens constitutions in respective embodiments will be explained in detail as follows.

In the first embodiment (FIG. 1), each lens group is constituted as follows. The first lens group Gr1 is composed of a negative meniscus lens (first lens L1) whose concave surface is an aspheric surface and faces the image side, and of prism PR, in this order from the object side. The second lens group Gr2 is composed of one biconvex positive lens whose surface facing the object side is an aspheric surface. The third lens group Gr3 is composed of a cemented lens that is constituted of a biconcave negative lens and of a positive meniscus lens whose convex surface faces the object side in this order from the object side. The fourth lens group Gr4 is composed of diaphragm ST, a biconvex positive lens having opposing aspheric surfaces, and of a cemented lens having therein a biconvex positive lens and a biconcave negative lens whose surface facing the image side is an aspheric surface, in this order from the object side. The fifth lens group Gr5 is composed of one negative meniscus lens having opposing aspheric surfaces in which the concave surface faces the image side. The sixth lens group Gr6 is composed of one positive meniscus lens whose opposing surfaces are aspheric surfaces and whose convex surface faces the image side.

In the second embodiment (FIG. 2), each lens group is constituted as follows. The first lens group Gr1 is composed of a negative meniscus lens (first lens L1) whose concave surface is an aspheric surface and faces the image side, and of prism PR, in this order from the object side. The second lens group Gr2 is composed of a cemented lens having therein a negative meniscus lens whose concave surface faces the image side and a biconvex positive lens whose surface facing the image side is an aspheric surface, in this order from the object side. The third lens group Gr3 is composed of a cemented lens having therein a positive meniscus lens whose convex surface faces the image side and a biconcave negative lens in this order from the object side. The fourth lens group Gr4 is composed of diaphragm ST, a biconvex positive lens whose opposing surfaces are aspheric surfaces, and of a negative meniscus lens whose concave surface faces the image side. The fifth lens group Gr5 is composed of one biconvex positive lens whose opposing surfaces are aspheric surfaces.

In the third embodiment (FIG. 3), each lens group is constituted as follows. The first lens group Gr1 is composed of a negative meniscus lens (first lens L1) whose concave surface is an aspheric surface and faces the image side and of prism PR, in this order from the object side. The second lens group Gr2 is composed of a cemented lens that is constituted of a biconvex positive lens whose surface facing the object side is an aspheric surface and of a negative meniscus lens whose concave surface faces the object side, in this order from the object side. The third lens group Gr3 is composed of a biconcave negative lens and of a positive meniscus lens whose convex surface faces the object side, in this order from the object side. The fourth lens group Gr4 is composed of diaphragm ST, a biconvex positive lens having opposing aspheric surfaces and of a cemented lens having therein a negative meniscus lens whose concave surface faces the image side and a positive meniscus lens whose convex surface faces the object side. The fifth lens group Gr5 is composed of one negative meniscus lens whose opposing surfaces are aspheric surfaces and whose concave surface faces the image side. The sixth lens group Gr6 is composed of one positive meniscus lens whose convex surface faces the image side and whose opposing surfaces are aspheric surfaces.

In the fourth embodiment (FIG. 4), each lens group is constituted as follows. The first lens group Gr1 is composed of a negative meniscus lens (first lens L1) whose concave surface is an aspheric surface and faces the image side, and of prism PR, in this order from the object side. The second lens group Gr2 is composed of a cemented lens having therein a biconvex positive lens whose surface facing the object side is an aspheric surface and a negative meniscus lens whose concave surface faces the object side, in this order from the object side. The third lens group Gr3 is composed of a cemented lens having therein a biconcave negative lens and a positive meniscus lens whose convex surface faces the object side, in this order from the object side. The fourth lens group Gr4 is composed of diaphragm ST, a cemented lens constituted of a biconvex positive lens and of a negative meniscus lens whose concave surface faces the object side, and of a cemented lens constituted of a negative meniscus lens whose concave surface faces the image side and of a positive meniscus lens whose convex surface faces the object side, in this order from the object side. The fifth lens group Gr5 is composed of one negative meniscus lens whose opposing surfaces are aspheric surfaces and whose concave surface faces the image side. The sixth lens group Gr6 is composed of one positive meniscus lens whose opposing surfaces are aspheric surfaces and whose convex surface faces the image side.

In the fifth embodiment (FIG. 5), each lens group is constituted as follows. The first lens group Gr1 is composed of a negative meniscus lens (first lens L1) whose concave surface is an aspheric surface and faces the image side, and of prism PR, in this order from the object side. The second lens group Gr2 is composed of a cemented lens having therein a biconvex positive lens whose surface facing the object side is an aspheric surface and a negative meniscus lens whose concave surface faces the object side, in this order from the object side. The third lens group Gr3 is composed of a cemented lens having therein a biconcave negative lens and a positive meniscus lens whose convex surface faces the object side, in this order from the object side. The fourth lens group Gr4 is composed of diaphragm ST, a biconcave positive lens whose surface facing the object side is an aspheric surface and of a cemented lens constituted of a negative meniscus lens whose concave surface faces the image side and a biconvex positive lens whose surface facing the image side is an aspheric surface. The fifth lens group Gr5 is composed of one negative meniscus lens whose opposing surfaces are aspheric surfaces and whose concave surface faces the image side.

Zoom lens ZL in each embodiment has the structure of a folding optical system including prism PR bending optical axis AX by almost 90° in the first lens group Gr1 as a optical-path bending element. The prism PR includes a reflection surface that bends a light flux by almost 90°, and the reflection surface bends an optical path for using the zoom lens ZL as a folded optical system. At that case, the light flux is reflected so that the optical axis AX may be bent by almost 90° (namely, by 90°, or substantially 90°). If the reflection surface for bending an optical path is provided in an optical path of zoom lens ZL in the aforesaid manner, a degree of freedom for arrangement of image pickup apparatus LU is enhanced, and thin image pickup apparatus LU in appearance can be achieved by changing the dimension in the thickness direction of image pickup apparatus LU. Incidentally, a position where an optical path is bent may also be determined at a front side or a rear side of zoom lens ZL in case of need, without being limited to the middle of the zoom lens ZL. By bending the optical path properly, it is possible to effectively achieve a thin or compact appearance of digital equipment CU on which image pickup apparatus LU is mounted.

In each embodiment, prism PR representing a reflection optical element is used as a optical-path bending element for bending optical axis AX and has the structure bending a light flux with one reflecting surface so as to bent optical axis AX of zoom lens ZL by almost 90°. The reflection optical element including the reflection surface may also be mirrors such as plane mirrors, for example, without being limited to prisms such as rectangular prisms. Further, the number of reflection surfaces owned in the optical-path bending element may also be two or more. In other words, it is also possible to use a reflection optical element that reflects a light flux so that optical axis AX of zoom lens ZL may be bent by almost 90° with two or more reflection surfaces. An optical action for bending an optical path is not limited to refection, and it may also be refraction, diffraction or combination thereof. In other words, it is also possible to use an optical-path bending element having a reflection surface, a refraction interface, a diffraction surface or a combination of two or more of them. Though the prism PR used in each embodiment has no optical power, it is also possible to provide the optical-path bending element bending the optical path with optical power. For example, by distributing a part of the optical power of the zoom lens ZL to a surface such as a reflection surface, a light entering surface, light emerging surface of the prism, and a reflection surface of a mirror, the optical power distributed to lens elements can be reduced, and thereby their optical capability can be improved.

EXAMPLES

Constitutions of zoom lenses as embodiments of the invention will be explained more specifically as follows, with citing construction data shown in Tables 1-5. Tables 1-5 show numerical value examples of Examples 1-5 which correspond respectively to the aforesaid First-Fifth Embodiments. Each of the optical structural diagrams indicating the First-Fifth Embodiments illustrated in FIG. 1-FIG. 5 shows a lens structure, optical path and zoom movement of corresponding Examples 1-5.

The construction data of each of Examples in Tables 1-5 includes columns of surface number, radius of curvature r (mm), axial surface-distance d (mm), refractive index nd for d line and Abbe's number vd for d line shown in this order from the left side. A surface labeled by the surface number followed by an asterisk "*" is an aspheric surface, and the surface is defined by the following expression (AS) that expresses a shape of an aspheric surface. Incidentally, as for terms of the expression whose data do not appear in the aspheric surface data in Tables 1-5, each of the terms has a coefficient with a value of 0. In all of the tables, E-n represents $\times 10^{-n}$.

$$X(H)=(CO \cdot H^2)/(1+\sqrt{(1-(1+K) \cdot CO^2 \cdot H^2)})+\Sigma(Aj \cdot H^j) \quad (AS)$$

In the expression (AS), X(H) represents a displacement (measured from the apex of the surface) in the optical axis AX direction at a position of height H, H represents a height in the direction perpendicular to optical axis AX, CO represents a paraxial curvature (=1/r), K represents a conic constant, and Aj represents a $j^{th}$ order aspheric surface coefficient.

Tables 1-5 further show various types of data: zoom ratio, focal length (mm), F-number, half angle of view (°), image height (mm), total length of a lens (mm), BF (mm), and variable surface distances (mm); and zoom lens group data: focal lengths (mm) of lens groups. The data of BF used in the tables is defined to indicate a distance from a surface of a cover glass (corresponding to parallel flat plate PT) facing the image side to an image plane. Further, Table 6 shows values corresponding to the conditional expressions of respective Examples.

Each of FIG. 6-FIG. 10 is an aberration diagram corresponding to each of Example 1-Example 5, and shows aberrations (spherical aberration, astigmatism and distortion in this order from the left side) at the wide-angle end (W), the midrange (M) and telephoto end (T). In FIG. 6-FIG. 10, FNO represents F-number and Y' (mm) represents the maximum image height (corresponding to the distance from optical axis AX) on light-receiving surface SS of image pickup element SR. In the aberration diagrams, solid line d shows spherical aberration (mm) for d line, one-dot chain line g shows spherical aberration (mm) for g line, and broken line SC shows an amount of offence against the sine condition (mm). In the astigmatism diagram, broken line DM shows a meridional surface, solid line DS shows each astigmatism (mm) for d line on a sagittal surface. In the distortion diagram, a solid line shows distortion (%) for d line.

TABLE 1

Example 1

Surface data

| Surface No. | r | d | nd | vd |
|---|---|---|---|---|
| Object plane | ∞ | ∞ | | |
| 1 | 28.386 | 0.700 | 1.82114 | 24.06 |
| 2* | 6.555 | 2.700 | | |
| 3 | ∞ | 8.150 | 1.90366 | 31.31 |
| 4 | ∞ | Variable | | |
| 5* | 9.374 | 1.700 | 1.58913 | 61.24 |
| 6 | −12.944 | Variable | | |
| 7 | −9.859 | 0.400 | 1.72916 | 54.66 |
| 8 | 3.800 | 1.300 | 1.84666 | 23.78 |
| 9 | 9.140 | Variable | | |
| 10 (Diaphragm) | ∞ | 0.500 | | |
| 11* | 4.582 | 1.550 | 1.58913 | 61.24 |
| 12* | −13.464 | 0.350 | | |
| 13 | 6.918 | 1.450 | 1.58913 | 61.24 |
| 14 | −5.641 | 0.600 | 1.82114 | 24.06 |
| 15* | 7.544 | Variable | | |
| 16* | 17.848 | 0.700 | 1.53048 | 55.72 |
| 17* | 4.020 | Variable | | |
| 18* | −232.064 | 1.750 | 1.60700 | 27.10 |
| 19* | −6.097 | 0.500 | | |
| 20 | ∞ | 0.500 | 1.51680 | 64.20 |
| 21 | ∞ | BF | | |
| Image plane | ∞ | | | |

Aspheric surface data

| | |
|---|---|
| $2^{nd}$ surface | K = 0.0000<br>A4 = −1.9011E−04<br>A6 = −7.6103E−06<br>A8 = 1.9315E−07<br>A10 = −6.9551E−09 |
| $5^{th}$ surface | K = 0.0000<br>A4 = −2.6723E−04<br>A6 = −1.3958E−05<br>A8 = 1.8905E−06<br>A10 = −1.0276E−07 |
| $11^{th}$ surface | K = 0.0000<br>A4 = −4.3502E−05<br>A6 = 7.5504E−05<br>A8 = −2.5270E−05<br>A10 = 1.6564E−06 |
| $12^{th}$ surface | K = 0.0000<br>A4 = 5.9535E−04<br>A6 = 3.7590E−05<br>A8 = −2.2362E−05<br>A10 = 1.9588E−06 |
| $15^{th}$ surface | K = 0.0000<br>A4 = 3.0614E−03<br>A6 = 2.1265E−04<br>A8 = 1.3114E−04<br>A10 = −2.1513E−05 |
| $16^{th}$ surface | K = 0.0000<br>A4 = 1.7083E−03<br>A6 = −1.1072E−03<br>A8 = 5.2021E−04<br>A10 = −6.7801E−05 |
| $17^{th}$ surface | K = 0.0000<br>A4 = 1.9406E−03<br>A6 = −1.4727E−03<br>A8 = 6.1027E−04<br>A10 = −7.6403E−05 |
| $18^{th}$ surface | K = 0.0000<br>A4 = −4.2793E−03<br>A6 = 1.1447E−03<br>A8 = −8.2678E−05<br>A10 = 1.8664E−06 |
| $19^{th}$ surface | K = 0.0000<br>A4 = −6.7192E−03<br>A6 = 2.0584E−03<br>A8 = −1.5526E−04<br>A10 = 3.6586E−06 |

TABLE 1-continued

Example 1

Various types of data
Zoom ratio 4.8

| | (W) wide-angle | (M) middle | (T) telephoto |
|---|---|---|---|
| Focal length | 3.752 | 8.255 | 18.011 |
| F-number | 3.500 | 4.704 | 6.000 |
| Half angle of view | 38.638 | 18.454 | 8.797 |
| Image height | 2.848 | 2.848 | 2.848 |
| Total length of lens | 42.000 | 42.000 | 42.000 |
| BF | 0.5000 | 0.5000 | 0.5000 |
| d4 | 6.6334 | 3.7479 | 0.4000 |
| d6 | 0.5086 | 3.3941 | 6.7420 |
| d9 | 7.2334 | 4.3479 | 1.0000 |
| d15 | 2.7906 | 1.1873 | 0.8240 |
| d17 | 1.4841 | 5.9728 | 9.6840 |

Zoom lens group data

| Group | Forefront surface | Focal length |
|---|---|---|
| 1 | 1 | −10.533 |
| 2 | 5 | 9.497 |
| 3 | 7 | −7.168 |
| 4 | 10 | 6.499 |
| 5 | 16 | −9.956 |
| 6 | 18 | 10.285 |

TABLE 2

Example 2

Surface data

| Surface No. | r | d | nd | vd |
|---|---|---|---|---|
| Object plane | ∞ | ∞ | | |
| 1 | 33.940 | 0.700 | 1.80470 | 40.95 |
| 2* | 6.209 | 3.350 | | |
| 3 | ∞ | 7.800 | 1.90366 | 31.31 |
| 4 | ∞ | Variable | | |
| 5 | 10.302 | 0.400 | 1.80610 | 33.27 |
| 6 | 4.723 | 2.600 | 1.76802 | 49.23 |
| 7* | −16.036 | Variable | | |
| 8 | −12.336 | 1.300 | 1.92286 | 20.88 |
| 9 | −4.347 | 0.400 | 1.83481 | 42.72 |
| 10 | 9.704 | Variable | | |
| 11 (Diaphragm) | ∞ | 0.500 | | |
| 12* | 3.807 | 1.800 | 1.58913 | 61.24 |
| 13* | −8.071 | 0.100 | | |
| 14 | 51.538 | 1.500 | 1.84666 | 23.78 |
| 15 | 3.820 | Variable | | |
| 16* | 21.215 | 1.700 | 1.53048 | 55.72 |
| 17* | −10.754 | Variable | | |
| 18 | ∞ | 0.500 | 1.51680 | 64.20 |
| 19 | ∞ | BF | | |
| Image plane | ∞ | | | |

Aspheric surface data

| | |
|---|---|
| $2^{nd}$ surface | K = 0.0000<br>A4 = −1.1719E−04<br>A6 = −2.6099E−05<br>A8 = 8.0678E−07<br>A10 = −2.0214E−08 |
| $7^{th}$ surface | K = 0.0000<br>A4 = 1.8300E−04<br>A6 = −7.4218E−07<br>A8 = 2.3925E−07<br>A10 = −1.4574E−08 |

TABLE 2-continued

Example 2

| | |
|---|---|
| 12th surface | K = 0.0000 |
| | A4 = −1.7614E−03 |
| | A6 = 4.0759E−04 |
| | A8 = −1.1872E−04 |
| | A10 = 1.7455E−05 |
| 13th surface | K = 0.0000 |
| | A4 = 2.3644E−03 |
| | A6 = 6.7233E−04 |
| | A8 = −1.9906E−04 |
| | A10 = 3.1381E−05 |
| 16th surface | K = 0.0000 |
| | A4 = −1.1632E−03 |
| | A6 = 2.2322E−04 |
| | A8 = −2.3575E−05 |
| | A10 = 1.0245E−06 |
| 17th surface | K = 0.0000 |
| | A4 = −1.4103E−03 |
| | A6 = 2.8719E−04 |
| | A8 = −2.4904E−05 |
| | A10 = 9.9023E−07 |

Various types of data
Zoom ratio 4.800

| | (W) wide-angle | (M) middle | (T) telephoto |
|---|---|---|---|
| Focal length | 3.753 | 8.256 | 18.012 |
| F-number | 3.500 | 4.100 | 5.625 |
| Half angle of view | 38.606 | 18.484 | 8.790 |
| Image height | 2.8480 | 2.8480 | 2.8480 |
| Total length of lens | 45.0000 | 45.0000 | 45.0000 |
| BF | 0.5001 | 0.5000 | 0.5000 |
| d4 | 6.5185 | 3.1557 | 0.4000 |
| d7 | 0.4537 | 3.8165 | 6.5722 |
| d10 | 7.1185 | 3.7557 | 1.0000 |
| d15 | 1.3006 | 6.4932 | 12.8495 |
| d17 | 6.4587 | 4.6289 | 1.0283 |

Zoom lens group data

| Group | Forefront surface | Focal length |
|---|---|---|
| 1 | 1 | −9.550 |
| 2 | 5 | 8.894 |
| 3 | 8 | −6.901 |
| 4 | 11 | 10.967 |
| 5 | 16 | 13.705 |
| 6 | 18 | — |

TABLE 3

Example 3

Surface data

| Surface No. | r | d | nd | vd |
|---|---|---|---|---|
| Object plane | ∞ | ∞ | | |
| 1 | 39.054 | 0.700 | 1.80470 | 40.95 |
| 2* | 6.339 | 2.500 | | |
| 3 | ∞ | 7.900 | 1.90366 | 31.31 |
| 4 | ∞ | Variable | | |
| 5* | 8.648 | 2.250 | 1.58913 | 61.24 |
| 6 | −8.990 | 0.400 | 1.84666 | 23.78 |
| 7 | −11.441 | Variable | | |
| 8 | −11.953 | 0.400 | 1.75700 | 47.73 |
| 9 | 4.521 | 1.050 | 1.92286 | 20.88 |
| 10 | 8.746 | Variable | | |
| 11 (Diaphragm) | ∞ | 0.500 | | |
| 12* | 4.395 | 1.450 | 1.62263 | 58.19 |

TABLE 3-continued

Example 3

| 13* | −14.674 | 0.520 | | |
|---|---|---|---|---|
| 14 | 11.051 | 0.400 | 1.84666 | 23.78 |
| 15 | 2.504 | 1.650 | 1.63980 | 34.57 |
| 16 | 10.529 | Variable | | |
| 17* | 12.788 | 0.700 | 1.53048 | 55.72 |
| 18* | 3.764 | Variable | | |
| 19* | −40.281 | 1.750 | 1.60700 | 27.10 |
| 20* | −5.153 | 0.660 | | |
| 21 | ∞ | 0.500 | 1.51680 | 64.20 |
| 22 | ∞ | BF | | |
| Image plane | ∞ | | | |

Aspheric surface data

| | |
|---|---|
| 2nd surface | K = 0.0000 |
| | A4 = −3.5267E−04 |
| | A6 = −6.0630E−06 |
| | A8 = 1.5229E−07 |
| | A10 = −7.8519E−09 |
| 5th surface | K = 0.0000 |
| | A4 = −3.8532E−04 |
| | A6 = −5.7198E−06 |
| | A8 = 4.0356E−07 |
| | A10 = −1.8697E−08 |
| 12th surface | K = 0.0000 |
| | A4 = 5.5890E−04 |
| | A6 = 3.5832E−04 |
| | A8 = −2.6362E−05 |
| | A10 = 1.5011E−05 |
| 13th surface | K = 0.0000 |
| | A4 = 3.0385E−03 |
| | A6 = 6.2078E−04 |
| | A8 = −1.0240E−04 |
| | A10 = 3.6057E−05 |
| 17th surface | K = 0.0000 |
| | A4 = −4.0085E−05 |
| | A6 = −1.0538E−03 |
| | A8 = 5.6124E−04 |
| | A10 = −6.6230E−05 |
| 18th surface | K = 0.0000 |
| | A4 = −8.6847E−04 |
| | A6 = −1.3890E−03 |
| | A8 = 6.4881E−04 |
| | A10 = −7.5523E−05 |
| 19th surface | K = 0.0000 |
| | A4 = 9.7048E−04 |
| | A6 = 3.9517E−04 |
| | A8 = −3.4571E−05 |
| | A10 = 5.2643E−07 |
| 20th surface | K = 0.0000 |
| | A4 = 4.2109E−03 |
| | A6 = 4.7605E−04 |
| | A8 = −5.4495E−05 |
| | A10 = 1.1656E−06 |

Various types of data
Zoom ratio 4.8001

| | (W) wide-angle | (M) middle | (T) telephoto |
|---|---|---|---|
| Focal length | 3.753 | 8.256 | 18.013 |
| F-number | 3.500 | 4.654 | 5.900 |
| Half angle of view | 38.631 | 18.460 | 8.801 |
| Image height | 2.848 | 2.848 | 2.848 |
| Total length of lens | 43.000 | 43.000 | 43.000 |
| BF | 0.4999 | 0.4998 | 0.4996 |
| d4 | 6.8468 | 3.9082 | 0.4000 |
| d7 | 0.4000 | 3.3385 | 6.8468 |
| d10 | 7.4468 | 4.5082 | 1.0000 |
| d16 | 2.9405 | 1.0569 | 0.6097 |
| d18 | 1.5360 | 6.3581 | 10.3135 |

TABLE 3-continued

Example 3

Zoom lens group data

| Group | Forefront surface | Focal length |
|---|---|---|
| 1 | 1 | −9.495 |
| 2 | 5 | 9.223 |
| 3 | 8 | −7.426 |
| 4 | 11 | 6.900 |
| 5 | 17 | −10.334 |
| 6 | 19 | 9.555 |

TABLE 4

Example 4

Surface data

| Surface No. | r | d | nd | νd |
|---|---|---|---|---|
| Object plane | ∞ | ∞ | | |
| 1 | 36.198 | 0.700 | 1.80470 | 40.95 |
| 2* | 5.968 | 2.600 | | |
| 3 | ∞ | 8.000 | 1.90366 | 31.31 |
| 4 | ∞ | Variable | | |
| 5* | 9.714 | 2.300 | 1.69350 | 53.39 |
| 6 | −9.480 | 0.400 | 1.84666 | 23.78 |
| 7 | −14.790 | Variable | | |
| 8 | −14.509 | 0.400 | 1.77250 | 49.65 |
| 9 | 4.690 | 1.150 | 1.92286 | 20.88 |
| 10 | 8.924 | Variable | | |
| 11 (Diaphragm) | ∞ | 0.500 | | |
| 12 | 10.423 | 1.550 | 1.71700 | 47.99 |
| 13 | −5.256 | 0.400 | 1.84666 | 23.78 |
| 14 | −12.097 | 0.100 | | |
| 15 | 5.700 | 1.150 | 1.84666 | 23.78 |
| 16 | 2.641 | 1.750 | 1.62004 | 36.30 |
| 17 | 8.105 | Variable | | |
| 18* | 45.094 | 0.700 | 1.53048 | 55.72 |
| 19* | 4.948 | Variable | | |
| 20* | −61.060 | 1.800 | 1.60700 | 27.10 |
| 21* | −5.056 | 0.500 | | |
| 22 | ∞ | 0.500 | 1.51680 | 64.20 |
| 23 | ∞ | BF | | |
| Image plane | ∞ | | | |

Aspheric surface data

| | |
|---|---|
| $2^{nd}$ surface | K = 0.0000<br>A4 = −4.2363E−04<br>A6 = −5.6879E−06<br>A8 = 9.9244E−08<br>A10 = −1.1579E−08 |
| $5^{th}$ surface | K = 0.0000<br>A4 = −2.3895E−04<br>A6 = −3.3035E−06<br>A8 = 2.2939E−07<br>A10 = −7.7843E−09 |
| $18^{th}$ surface | K = 0.0000<br>A4 = −1.1284E−05<br>A6 = −8.0172E−04<br>A8 = 4.4194E−04<br>A10 = −4.5649E−05 |
| $19^{th}$ surface | K = 0.0000<br>A4 = 9.3830E−04<br>A6 = −1.2695E−03<br>A8 = 5.8122E−04<br>A10 = −6.1016E−05 |
| $20^{th}$ surface | K = 0.0000<br>A4 = −2.2838E−03<br>A6 = 8.7920E−04<br>A8 = −6.0290E−05<br>A10 = 9.8138E−07 |

TABLE 4-continued

Example 4

| | |
|---|---|
| $21^{st}$ surface | K = 0.0000<br>A4 = −1.0449E−04<br>A6 = 1.2492E−03<br>A8 = −9.8593E−05<br>A10 = 1.9595E−06 |

Various types of data
Zoom ratio 4.80004

| | (W) wide-angle | (M) middle | (T) telephoto |
|---|---|---|---|
| Focal length | 3.753 | 8.256 | 18.012 |
| F-number | 3.500 | 4.675 | 6.000 |
| Half angle of view | 38.580 | 18.475 | 8.789 |
| Image height | 2.848 | 2.848 | 2.848 |
| Total length of lens | 45.000 | 45.000 | 45.000 |
| BF | 0.5000 | 0.4999 | 0.4998 |
| d4 | 7.0943 | 4.0795 | 0.4000 |
| d7 | 0.4044 | 3.4191 | 7.0986 |
| d10 | 7.6943 | 4.6795 | 1.0000 |
| d17 | 3.3649 | 1.2746 | 0.9798 |
| d19 | 1.4422 | 6.5472 | 10.5215 |

Zoom lens group data

| Group | Forefront surface | Focal length |
|---|---|---|
| 1 | 1 | −8.973 |
| 2 | 5 | 9.277 |
| 3 | 8 | −7.890 |
| 4 | 11 | 7.252 |
| 5 | 18 | −10.541 |
| 6 | 20 | 8.973 |

TABLE 5

Example 5

Surface data

| Surface No. | r | d | nd | νd |
|---|---|---|---|---|
| Object plane | ∞ | ∞ | | |
| 1 | 34.293 | 0.700 | 1.80470 | 40.95 |
| 2* | 6.632 | 2.825 | | |
| 3 | ∞ | 8.500 | 1.90366 | 31.31 |
| 4 | ∞ | Variable | | |
| 5* | 10.559 | 2.100 | 1.58913 | 61.24 |
| 6 | −8.492 | 0.400 | 1.84666 | 23.78 |
| 7 | −11.287 | Variable | | |
| 8 | −10.942 | 0.400 | 1.80610 | 40.73 |
| 9 | 4.505 | 1.200 | 1.92286 | 20.88 |
| 10 | 13.597 | Variable | | |
| 11 (Diaphragm) | ∞ | 0.500 | | |
| 12* | 4.197 | 1.650 | 1.58913 | 61.24 |
| 13 | −18.281 | 0.100 | | |
| 14 | 55.230 | 0.400 | 1.83400 | 37.35 |
| 15 | 2.788 | 2.250 | 1.58913 | 61.24 |
| 16* | −16.311 | Variable | | |
| 17* | 27.631 | 0.700 | 1.53048 | 55.72 |
| 18* | 5.912 | Variable | | |
| 19 | ∞ | 0.500 | 1.51680 | 64.20 |
| 20 | ∞ | BF | | |
| Image plane | ∞ | | | |

TABLE 5-continued

Example 5

Aspheric surface data

| | |
|---|---|
| $2^{nd}$ surface | K = 0.0000 |
| | A4 = −3.1690E−04 |
| | A6 = −9.6428E−06 |
| | A8 = 2.6490E−07 |
| | A10 = −8.0563E−09 |
| $5^{th}$ surface | K = 0.0000 |
| | A4 = −2.3013E−04 |
| | A6 = −9.0443E−06 |
| | A8 = 9.5299E−07 |
| | A10 = −4.2327E−08 |
| $12^{th}$ surface | K = 0.0000 |
| | A4 = −1.1094E−03 |
| | A6 = 4.7004E−05 |
| | A8 = −2.3625E−05 |
| | A10 = 1.9117E−06 |
| $16^{th}$ surface | K = 0.0000 |
| | A4 = 6.3701E−04 |
| | A6 = 2.6809E−04 |
| | A8 = −7.6570E−05 |
| | A10 = 5.8830E−06 |
| $17^{th}$ surface | K = 0.0000 |
| | A4 = −4.4082E−04 |
| | A6 = 5.8445E−04 |
| | A8 = −9.2191E−05 |
| | A10 = 2.2598E−06 |
| $18^{th}$ surface | K = 0.0000 |
| | A4 = 1.2090E−04 |
| | A6 = 3.1909E−04 |
| | A8 = 3.7296E−06 |
| | A10 = −8.8357E−06 |

Various types of data
Zoom ratio 4.800

| | (W) wide-angle | (M) middle | (T) telephoto |
|---|---|---|---|
| Focal length | 3.753 | 8.256 | 18.012 |
| F-number | 3.500 | 4.719 | 6.000 |
| Half angle of view | 38.601 | 18.422 | 8.739 |
| Image height | 2.8480 | 2.8480 | 2.8480 |
| Total length of lens | 46.0000 | 46.0000 | 46.0000 |
| BF | 0.4999 | 0.4999 | 0.4999 |
| d4 | 7.6412 | 4.3702 | 0.4000 |
| d7 | 0.4079 | 3.6789 | 7.6491 |
| d10 | 8.2412 | 4.9702 | 1.0000 |
| d16 | 4.0366 | 1.2435 | 0.6535 |
| d18 | 2.9477 | 9.0118 | 13.5720 |

Zoom lens group data

| Group | Forefront surface | Focal length |
|---|---|---|
| 1 | 1 | −10.334 |
| 2 | 5 | 10.338 |
| 3 | 8 | −8.452 |
| 4 | 11 | 7.483 |
| 5 | 17 | −14.339 |
| 6 | 19 | — |

TABLE 6

| Value of conditional expression | | Example 1 | Example 2 | Example 3 | Example 4 | Example 5 |
|---|---|---|---|---|---|---|
| Conditional expression (1) | φ23w · fw | −0.034 | −0.002 | 0.006 | 0.033 | −0.009 |
| Conditional expression (2) | f12t/ft | 0.634 | 0.517 | 0.608 | 0.620 | 0.708 |
| Conditional expression (3) | |f1|/fw | 2.807 | 2.545 | 2.530 | 2.391 | 2.754 |

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom lens comprising, in order from an object side thereof:
    a first lens group having a negative optical power and comprising a reflection optical element for bending an optical path by almost 90 degrees;
    a second lens group having a positive optical power;
    a third lens group having a negative optical power;
    a fourth lens group having a positive optical power; and,
    a fifth lens group,
    wherein the zoom lens further comprises a diaphragm arranged between a surface closest to an image side of the zoom lens in the third lens group and a surface closest to the image side in the fourth lens group,
    at least the second lens group and the fourth lens group move to the object side so as to reduce a distance between the first lens group and the second lens group and a distance between the third lens group and the fourth lens group, for varying a power of the zoom lens from a wide-angle end to a telephoto end, and
    the diaphragm moves to the object side for varying the power of the zoom lens from the wide-angle end to the telephoto end.

2. The zoom lens of claim 1,
    wherein an open aperture of the diaphragm keeps a fixed diameter for varying the power of the zoom lens.

3. The zoom lens of claim 1,
    wherein the zoom lens satisfies a following expression:

$-0.05 < \phi 23w \times fw < 0.05$, where $\phi 23w$ is a composite optical power of the second lens group and the third lens group at the wide-angle end, and
    fw is a focal length of the zoom lens at the wide-angle end.

4. The zoom lens of claim 1,
    wherein the second lens group and the fourth lens group move as one body for varying the power of the zoom lens.

5. The zoom lens of claim 1,
    wherein the third lens is statically positioned for varying the power of the zoom lens.

6. The zoom lens of claim 1, further comprising
    a mechanical shutter arranged at a position between the second lens group and the third lens group or a position between the third lens group and the fourth lens group,
    wherein the mechanical shutter is statically positioned for varying the power of the zoom lens.

7. The zoom lens of claim 1,
wherein the first lens comprises:
 a negative lens arranged closest to the object side and comprising a concave surface facing the image side, and
the concave surface is an aspheric surface such that a negative refractive power at a position on the aspheric surface becomes smaller as the position moves from a center to a periphery of the aspheric surface.

8. The zoom lens of claim 1,
wherein the first lens group consists of one negative lens and the reflection optical element.

9. The zoom lens of claim 1,
wherein the zoom lens satisfies following expressions:

$$0.4 < f12t/ft < 0.8$$

$$2.0 < |f1|/fw < 3.2$$

where f12t is a composite focal length of the first lens group and the second lens group at the telephoto end,
f1 is a focal length of the first lens group,
ft is a focal length of the zoom lens at the telephoto end, and
fw is a focal length of the zoom lens at the wide-angle end.

10. The zoom lens of claim 9,
wherein the zoom lens satisfies following expressions:

$$0.5 < f12t/ft < 0.74$$

$$2.2 < |f1|/fw < 2.9$$

11. The zoom lens of claim 1,
wherein the fifth lens group has a positive optical power, and
the second lens group, the fourth lens group and the fifth lens group move for varying the power of the zoom lens.

12. The zoom lens of claim 1,
wherein the fifth lens group has a negative optical power, and
the second lens group, the fourth lens group and the fifth lens group move for varying the power of the zoom lens.

13. The zoom lens of claim 1, further comprising
a sixth lens group having a positive optical power and arranged at the image side of the fifth lens group,
wherein the fifth lens group has a negative optical power, and
the second lens group, the fourth lens group and the fifth lens group move for varying the power of the zoom lens.

14. An image pickup apparatus comprising:
an image pickup element comprising a light-receiving surface for converting an optical image formed on the light-receiving surface into electric signal; and
the zoom lens of claim 1 for forming an optical image of a subject on the light-receiving surface of the image pickup element.

15. A digital equipment comprising:
the image pickup apparatus of claim 14, and
a controller for controlling the image pickup apparatus to shoot a still image or a video of a subject.

\* \* \* \* \*